(12) United States Patent  (10) Patent No.: US 9,091,411 B2
Huang et al.  (45) Date of Patent: Jul. 28, 2015

(54) ILLUMINATION TECHNIQUES AND DEVICES

(71) Applicants: Qiong Huang, Winchester, MA (US); Joseph A. Olsen, Gloucester, MA (US)

(72) Inventors: Qiong Huang, Winchester, MA (US); Joseph A. Olsen, Gloucester, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 344 days.

(21) Appl. No.: 13/667,685

(22) Filed: Nov. 2, 2012

(65) Prior Publication Data

US 2014/0126239 A1    May 8, 2014

(51) Int. Cl.
*F21V 8/00* (2006.01)
*F21V 7/04* (2006.01)

(52) U.S. Cl.
CPC .................................. *F21V 7/04* (2013.01)

(58) Field of Classification Search
CPC ..... F21V 5/005; F21V 7/048; F21V 2008/00; G02B 6/0041; G02B 6/076; G02B 6/0078
USPC .................. 362/609, 612, 613, 616, 628, 629
See application file for complete search history.

(56) References Cited

U.S. PATENT DOCUMENTS

| | | | |
|---|---|---|---|
| 4,260,220 A | 4/1981 | Whitehead | |
| 4,874,228 A | 10/1989 | Aho et al. | |
| 4,907,132 A | 3/1990 | Parker | |
| 5,005,108 A | 4/1991 | Pristash et al. | |
| 5,136,480 A | 8/1992 | Pristash et al. | |
| 5,568,964 A | 10/1996 | Parker et al. | |
| 5,613,751 A | 3/1997 | Parker et al. | |
| 5,618,096 A | 4/1997 | Parker et al. | |
| 5,876,107 A | 3/1999 | Parker et al. | |
| 5,894,686 A | 4/1999 | Parker et al. | |
| 5,921,652 A | 7/1999 | Parker et al. | |
| 5,975,711 A | 11/1999 | Parker et al. | |
| 6,079,838 A | 6/2000 | Parker et al. | |
| 6,575,584 B1 | 6/2003 | Habraken | |
| 6,591,049 B2 | 7/2003 | Williams et al. | |

(Continued)

OTHER PUBLICATIONS

Fundamentals for Low Profile, High Brightness LCD Backlight, Alan J. Ames, Proc of SPIE 4021, 187 (2000).

(Continued)

*Primary Examiner* — David V Bruce
(74) *Attorney, Agent, or Firm* — Andrew Martin

(57) ABSTRACT

Techniques are disclosed for extracting light from within a lightguide by providing therein a plurality of internal light extraction features. A broad range of internal light extraction feature configurations (e.g., geometries/shapes, materials, refractive index changes, etc.) can be provided, and a variety of processes/techniques (e.g., 3-D printing, laser cutting/etching, injection molding, embossment, layer stacking, extrusion, etc.) can be used to do so. The features can be configured to achieve any desired set of photometric performance criteria (e.g., single/double-sided emission, optical efficiency, energy efficiency, spatial/angular luminance distribution, intensity gradients, etc.) for a given lightguide-based fixture/device. In some cases, internal and surficial light extraction features can be used together to extract light. Also, a wide variety of lighting fixtures/devices (e.g., panels, bulbs, tubes, rings, containers, three-dimensional structures/sculptures, multi-layered, multi-sectioned, etc.) can be produced using the disclosed techniques. In some cases, transparent/semi-transparent devices can be produced.

33 Claims, 16 Drawing Sheets

(56) References Cited

U.S. PATENT DOCUMENTS

| | | |
|---|---|---|
| 6,712,481 B2 | 3/2004 | Parker et al. |
| 6,749,312 B2 | 6/2004 | Parker et al. |
| 6,752,505 B2 | 6/2004 | Parker et al. |
| 6,755,547 B2 | 6/2004 | Parker |
| 6,767,122 B2 | 7/2004 | Honguh et al. |
| 6,796,668 B2 | 9/2004 | Parker et al. |
| 6,886,956 B2 | 5/2005 | Parker et al. |
| 6,936,968 B2 | 8/2005 | Cross et al. |
| 7,004,611 B2 | 2/2006 | Parker et al. |
| 7,077,544 B2 | 7/2006 | Parker |
| 7,108,414 B2 | 9/2006 | McCollum et al. |
| 7,160,015 B2 | 1/2007 | Parker |
| 7,165,873 B2 | 1/2007 | Parker |
| 7,178,965 B2 | 2/2007 | Parker |
| 7,195,389 B2 | 3/2007 | Parker et al. |
| 7,226,196 B2 | 6/2007 | Parker et al. |
| 7,278,775 B2 | 10/2007 | Yeo et al. |
| 7,300,194 B2 | 11/2007 | Parker |
| 7,322,730 B2 | 1/2008 | Parker |
| 7,354,184 B2 | 4/2008 | Parker |
| 7,357,553 B2 | 4/2008 | Parker |
| 7,374,305 B2 | 5/2008 | Parker |
| 7,384,177 B2 | 6/2008 | Parker |
| 7,404,660 B2 | 7/2008 | Parker |
| 7,404,661 B2 | 7/2008 | Parker et al. |
| 7,416,315 B2 | 8/2008 | Blumel |
| 7,431,489 B2 | 10/2008 | Yeo et al. |
| 7,434,973 B2 | 10/2008 | Parker et al. |
| 7,434,974 B2 | 10/2008 | Parker |
| 7,467,887 B2 | 12/2008 | Parker |
| 7,513,672 B2 | 4/2009 | Parker |
| 7,524,101 B2 | 4/2009 | Parker |
| 7,537,370 B2 | 5/2009 | Parker |
| 7,542,635 B2 | 6/2009 | Coleman |
| 7,563,012 B2 | 7/2009 | Parker |
| 7,658,514 B2 | 2/2010 | Lee et al. |
| 7,697,090 B2 | 4/2010 | Shimizu |
| 7,703,967 B2 | 4/2010 | Parker |
| 7,736,043 B2 | 6/2010 | Parker |
| 7,780,329 B2 | 8/2010 | McCollum et al. |
| 7,798,695 B2 | 9/2010 | Parker |
| 7,810,982 B2 | 10/2010 | Parker et al. |
| 7,963,687 B2 | 6/2011 | Parker |
| 2004/0062031 A1* | 4/2004 | Pinter ............................ 362/31 |
| 2011/0013420 A1 | 1/2011 | Coleman et al. |
| 2012/0013647 A1* | 1/2012 | Fang et al. .................... 362/606 |
| 2012/0236595 A1* | 9/2012 | Parker et al. ................. 362/609 |

OTHER PUBLICATIONS

Backlight Pattern Optimization, William J. Cassarly, Proc. SPIE 6834, 683407 (2007).

Design Optimization for Optical Patterns in a Light-guide Panel to Improve Illuminance and Uniformity of the Liquid-crystal Display, Gabseong Lee, Jae Ho Jeong, Sang-Joon Yoon, Dong-Hoon Choi, Optical Engineering, 48, 024001 (2009).

New Efficient Light Guide for Interior Illumination, LA Whitehead, RA Nodwell, FL Curzon, Applied Optics, 21, 2755 (1982).

Lightweight Compact 2D/3D Autostereoscopic LCD Backlight for Games, Monitor, and Notebook Applications, Jesse B. Eichenlaub, Proc. SPIE 3012, 274 (1997).

Side-emitting Illuminators Using LED Sources, Feng Zhao and John F. Van Derlofske, Proc. SPIE 5186, 33 (2003).

Novel Photonic Polymer and Its Application in IT, Yasuhiro Koike, Proc SPIE 5061, 59 (2003).

\* cited by examiner

Figure 1A
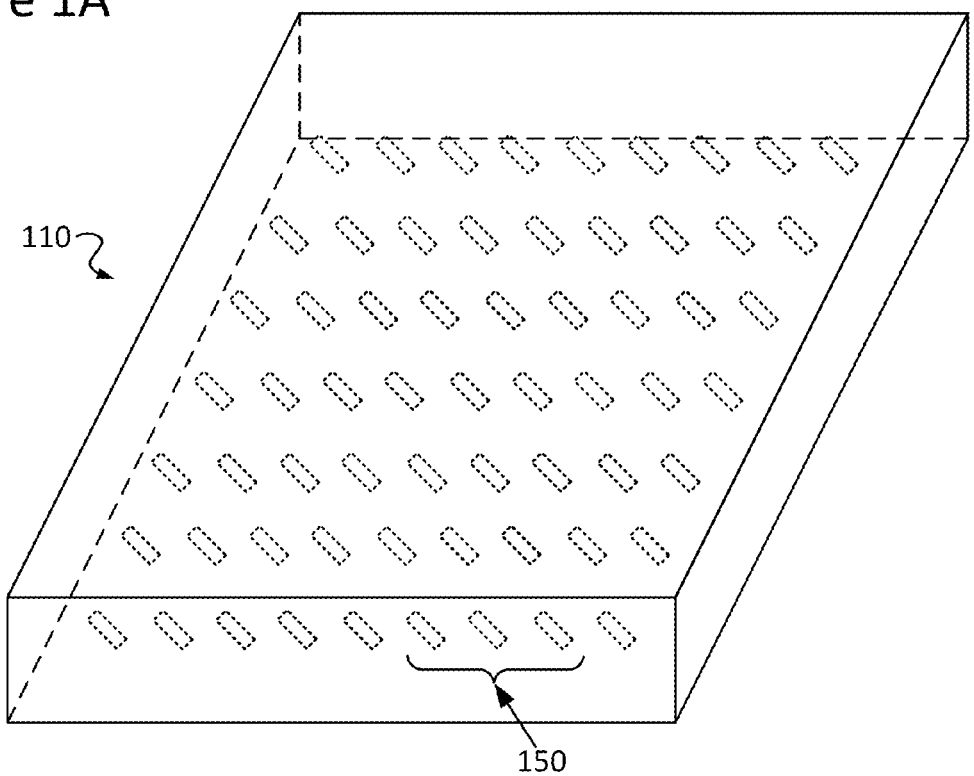
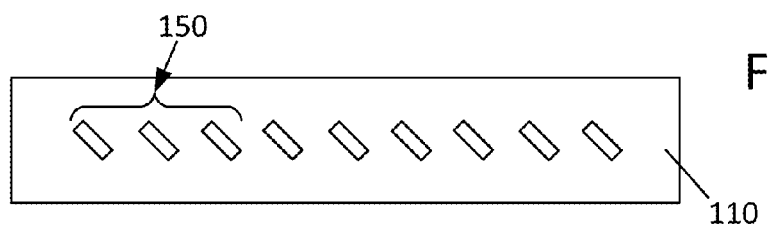
Figure 1B

Figure 2A
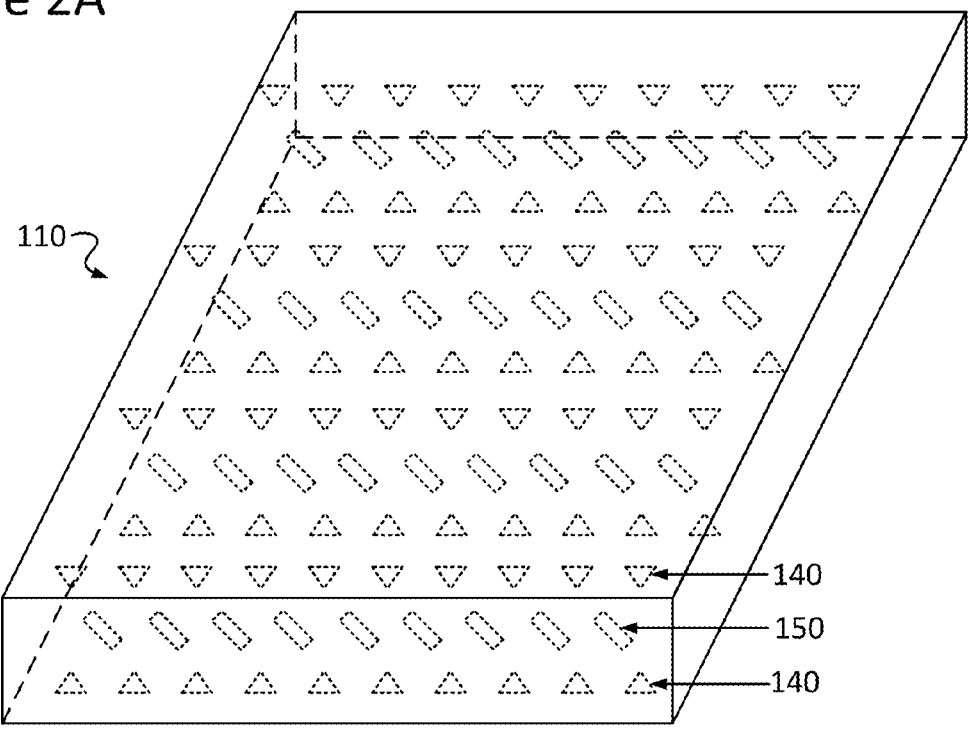
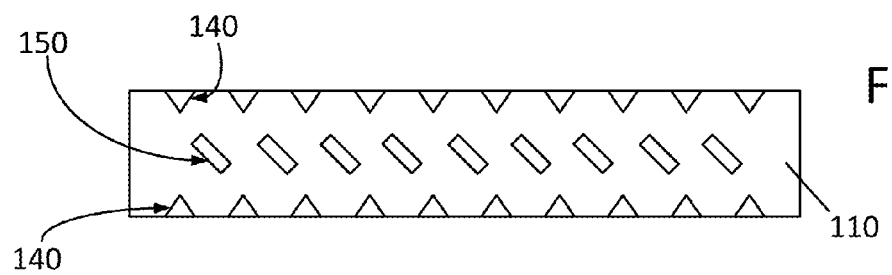
Figure 2B

Figure 3A
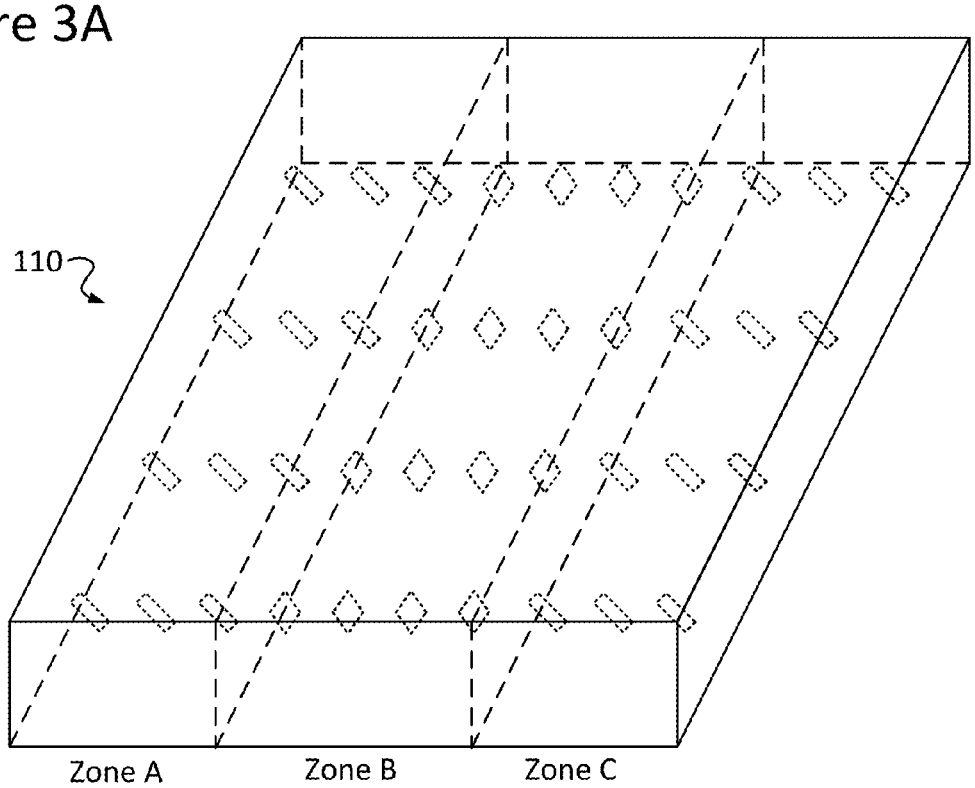
Zone A    Zone B    Zone C
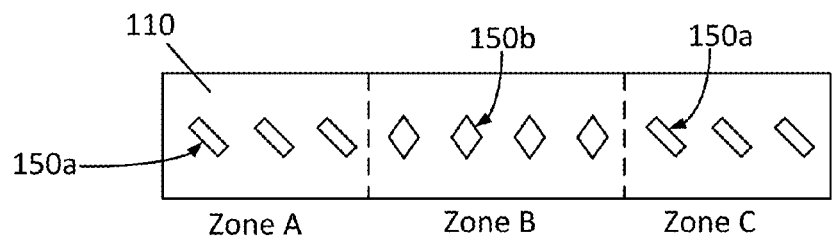
Figure 3B

Figure 4A
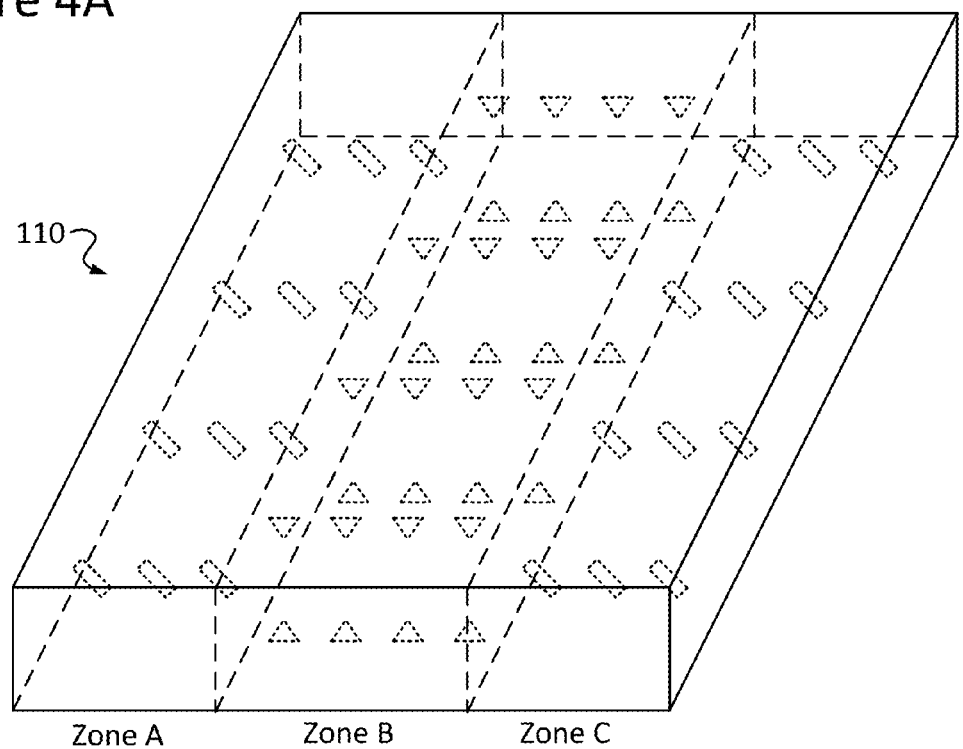
Zone A　　Zone B　　Zone C
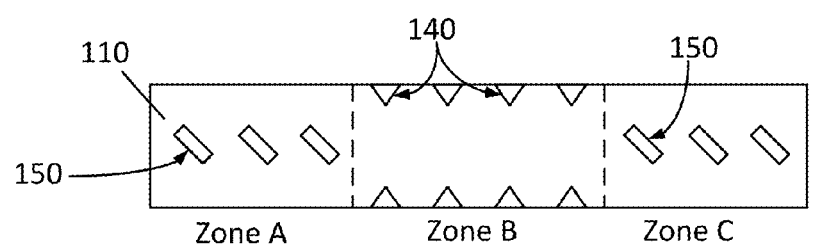
Figure 4B

Figure 11A
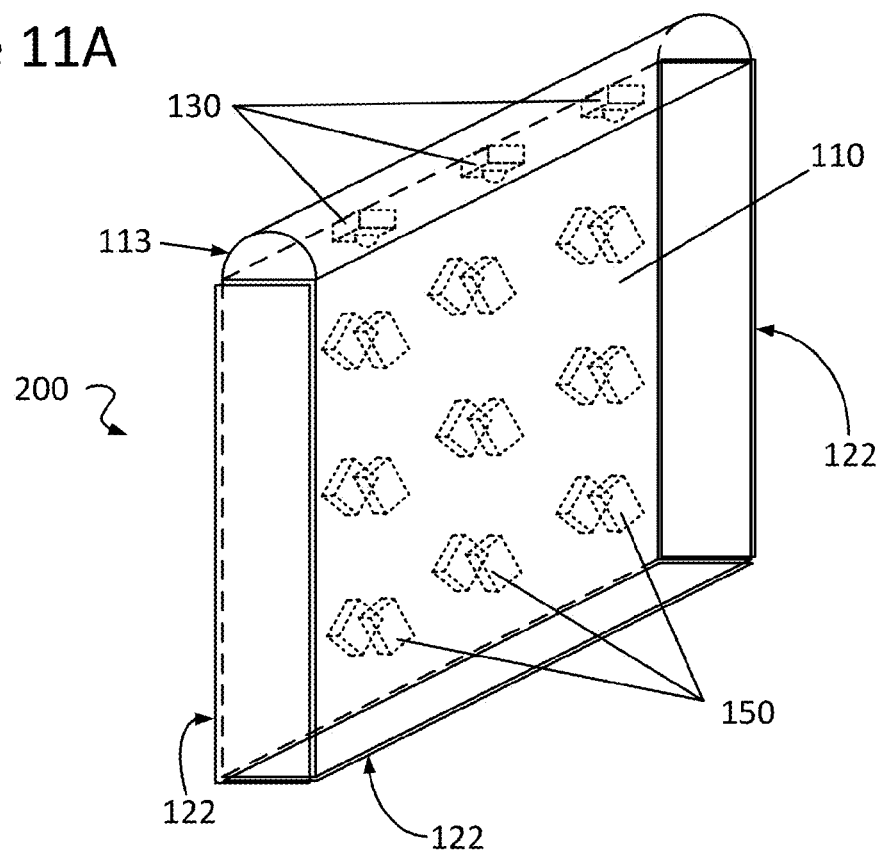
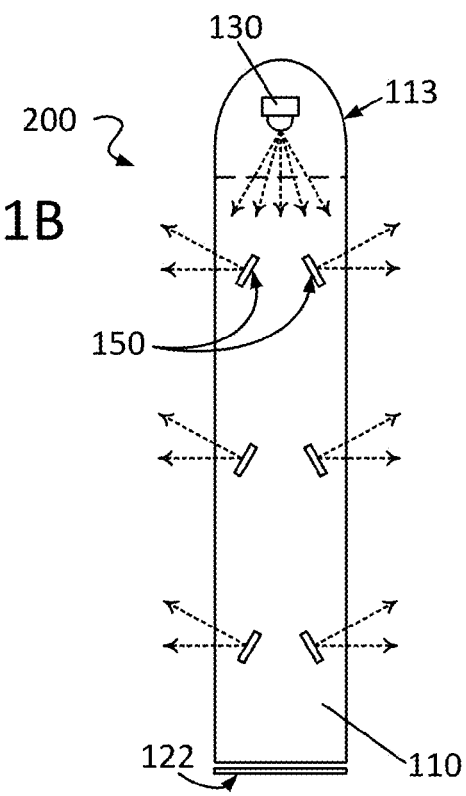
Figure 11B

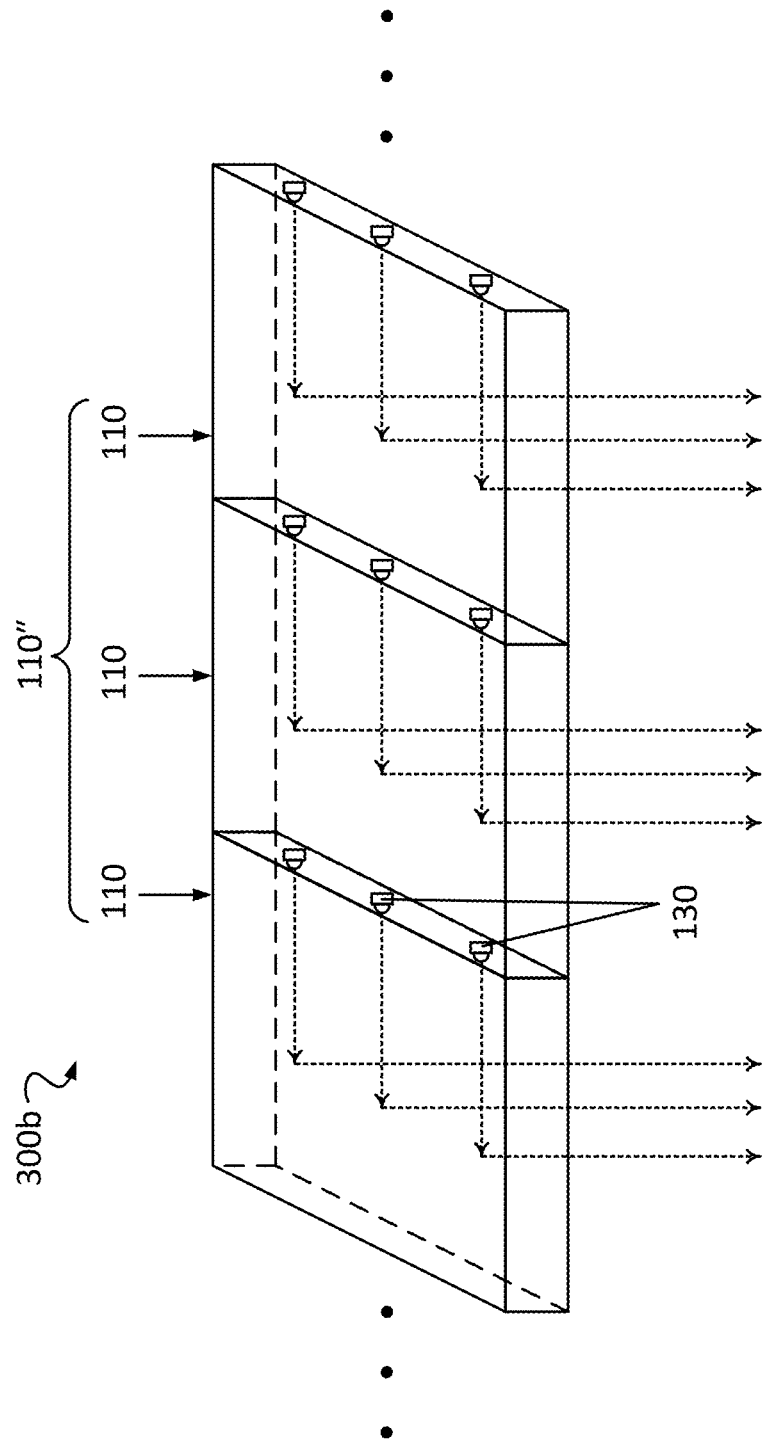

ILLUMINATION TECHNIQUES AND DEVICES

FIELD OF THE DISCLOSURE

The invention relates to lightguides and more particularly to lightguide-based fixtures/devices.

BACKGROUND

Lightguide-based lighting design involves a number of non-trivial challenges, and light emitting diode (LED)-based fixtures/devices have faced particular complications.

BRIEF DESCRIPTION OF THE DRAWINGS

FIGS. 1A and 1B are a perspective view and a side view, respectively, of a lightguide configured with internal light extraction features, in accordance with an embodiment of the present invention.

FIGS. 2A and 2B are a perspective view and a side view, respectively, of a lightguide configured with internal light extraction features and surficial light extraction features, in accordance with an embodiment of the present invention.

FIGS. 3A and 3B are a perspective view and a side view, respectively, of a lightguide having a plurality of zones of internal light extraction features, in accordance with an embodiment of the present invention.

FIGS. 4A and 4B are a perspective view and a side view, respectively, of a lightguide having a plurality of zones of internal light extraction features and surficial light extraction features, in accordance with an embodiment of the present invention.

FIGS. 11A and 11B are a perspective view and a cross-sectional side view, respectively, of a lighting panel/fixture configured in accordance with an embodiment of the present invention.

FIG. 12B is a perspective view of a lighting panel/fixture, configured in accordance with an embodiment of the present invention.

Figure 5A:
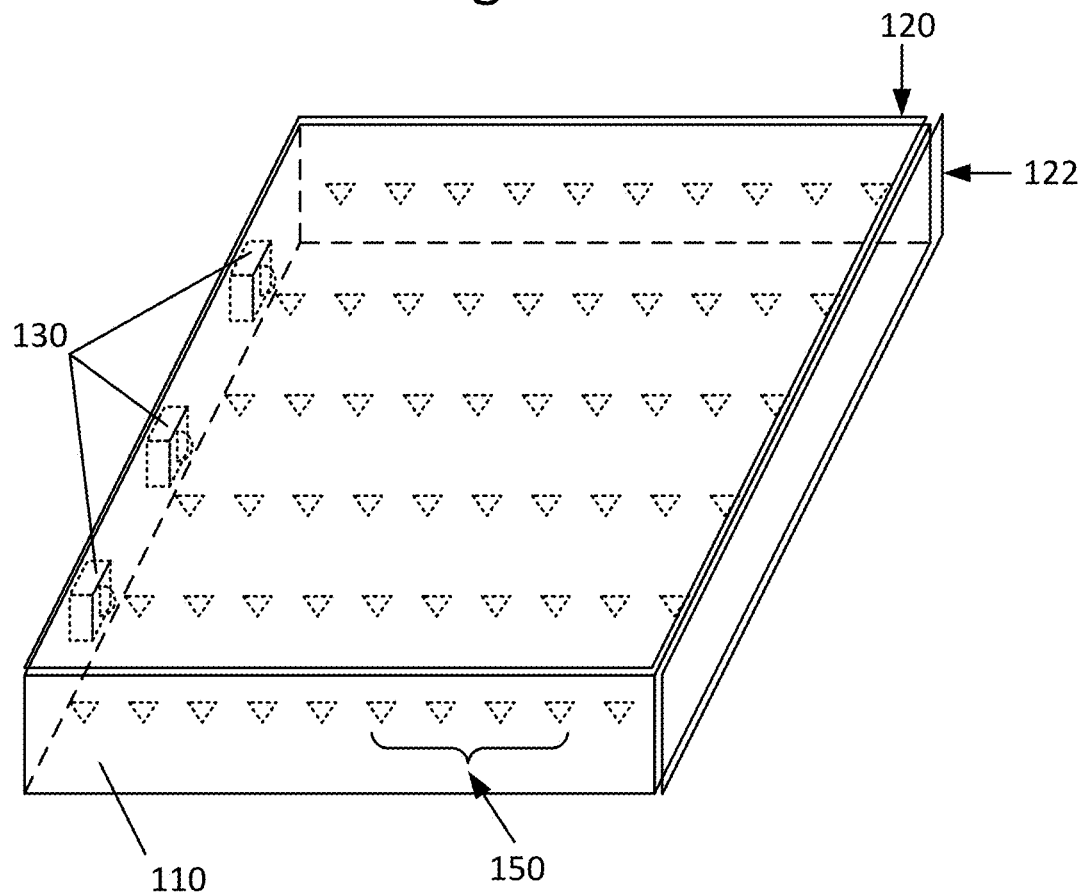
FIGS. 5A and 5B are a perspective view and a side view, respectively, of a lightguide configured in accordance with an embodiment of the present invention.

The accompanying drawings are not intended to be drawn to scale.

DETAILED DESCRIPTION

Techniques are disclosed for extracting light from within a lightguide by providing therein a plurality of internal light extraction features (e.g., materials and/or structures). A broad range of internal light extraction feature configurations (e.g., geometries/shapes, materials, refractive index changes, etc.) can be provided, and a variety of processes/techniques (e.g., 3-D printing, laser cutting/etching, injection molding, embossment, layer stacking, extrusion, etc.) can be used to do so. The features can be configured to achieve any desired set of photometric performance criteria (e.g., single/double-sided emission, optical efficiency, energy efficiency, spatial/angular luminance distribution, intensity gradients, etc.) for a given lightguide-based fixture/device. In some cases, internal and surficial light extraction features can be used together to extract light. Also, a wide variety of lighting fixtures/devices (e.g., panels, bulbs, tubes, rings, containers, three-dimensional structures/sculptures, multi-layered, multi-sectioned, etc.) can be produced using the disclosed techniques. In some cases, transparent/semi-transparent devices can be produced. Numerous configurations and variations will be apparent in light of this disclosure.

General Overview

Existing edge-lit fixture designs typically include a lightguide having one or more light emitting diodes (LEDs) edge-coupled thereto. The LEDs emit light into the lightguide, where it is typically guided in a contained fashion as a result of total internal reflection (TIR) therein. Existing lightguide designs typically utilize a surface texture on the lightguide surface to extract light from the lightguide. Generally, the surface texture comprises a plurality of surficial light extraction features consisting of a single application-specific material and having a single application-specific geometry/shape. Also, existing designs use a back reflector on the back (non-emitting) surface of the lightguide to reflect/redirect light which is extracted in an undesired direction (e.g., light which otherwise would escape the lightguide through the back/non-emitting surface if not for the presence of the back reflector) back towards/through a desired output surface of the fixture.

However, existing edge-lit fixture designs are associated with a number of non-trivial issues. For instance, one such issue pertains to the fact that existing lightguides which utilize a surface texture (of surficial light extraction features) are substantially limited in the amount of curvature that they can undergo while still maintaining the requisite TIR conditions therein. Another non-trivial issue pertains to the fact that existing designs require use of a back reflector to address optical efficiency concerns and to provide single-sided emission when desired. However, inclusion of a back reflector adversely increases design complexity and cost, as well as precludes the fixture from being transparent (and/or semi-transparent).

Thus, and in accordance with an embodiment of the present invention, techniques are disclosed for extracting light from within a lightguide by providing therein one or more internal light extraction features. In accordance with an embodiment, the internal light extraction features can be materials and/or structures (two-dimensional and/or three-dimensional) and can have any of a broad range of configurations (e.g., geometries/shapes, compositional materials, refractive index changes, etc.). Furthermore, and in accordance with an embodiment, the internal light extraction features can be provided within a lightguide using any of a variety of techniques/processes (e.g., 3-D printing, laser cutting/etching, injection molding, embossment, layer stacking, extrusion, etc.).

Also, in accordance with an embodiment, the internal light extraction features can be configured to achieve any desired set of photometric performance criteria (e.g., single/double-sided emission, optical efficiency, energy efficiency, intensity gradients, etc.) for a given lightguide-based fixture/device. Furthermore, and in accordance with an embodiment, the internal light extraction features can be configured to achieve a desired spatial and/or angular distribution, for example, of luminance, illuminance, luminous intensity, color, color temperature, correlated color temperature (CCT), color rendering index (CRI), and/or any other light property (uniform and/or non-uniform) for a given lightguide-based fixture/device. In some cases, and in accordance with an embodiment, the disclosed techniques can be used to provide a given lightguide with both internal light extraction features and surficial light extraction features, which can be used together to extract light from the lightguide.

As will be appreciated in light of this disclosure, and in accordance with an embodiment, the disclosed techniques can be used to provide a lightguide with internal or both internal and surficial light extraction features which are configured to extract light from within the lightguide by means of a wide variety of light extraction mechanisms, such as: (1) total internal reflection (TIR); (2) reflection; (3) refraction; (4) transmission; (5) absorption; (6) scattering; and/or (7) any other light extraction techniques/mechanisms suitable for extracting light from within a lightguide.

As will be further appreciated in light of this disclosure, one or more embodiments of the present invention can be used to provide a lightguide which achieves single-sided emission without use of a reflector (e.g., back reflector, side reflector, etc.) and with high optical efficiency (e.g., greater than 65%; greater than 70%; greater than 75%; greater than 80%; greater than 85%; greater than 90%; etc.). In some such instances, a high total energy efficiency can be obtained (e.g., greater than 65%; greater than 70%; greater than 75%; greater than 80%; greater than 85%; greater than 90%; etc.). In some cases, the disclosed techniques can be used to provide an edge-lit panel/fixture, for example, having higher optical efficiency and higher energy efficiency than can be achieved by existing approaches/designs.

As a further example, optional omission of a back reflector, in accordance with an embodiment, can reduce the total number of components, the design complexity, and/or the cost of a lighting fixture/device implementing a lightguide provided using the disclosed techniques. As yet a further example, optional omission of a back reflector, in accordance with an embodiment, may allow for a transparent/semi-transparent lightguide and thus allow for a lighting fixture/device that is light-transmissive (e.g., ambient light, sunlight, etc.), for instance, when the light source is off. As discussed below, and in accordance with one or more embodiments, a wide variety of transparent structures (e.g., windows, containers, sculptures, etc.) which also may function as light sources or may be otherwise capable of being illuminated can be provided using the disclosed techniques.

As still another example, one or more embodiments of the present invention can be used to provide a lightguide with a greater curvature tolerance (e.g., TIR conditions are maintained over a greater curvature range) as compared to existing approaches/designs. Thus, and in accordance with an embodiment, the disclosed techniques can be used with planar as well as with rounded/curved or otherwise non-planar lightguides (and associated panels, fixtures, devices, etc.).

As yet a further example, one or more embodiments of the present invention can be used to provide a multi-layered and/or multi-section lightguide which may allow for three-dimensional lighting designs. In some cases, an edge-lit panel/fixture having multiple lightguide layers/sections which can function simultaneously without substantially interfering with one another can be provided. Also, in some instances, a substantially greater quantity of light sources (e.g., LEDs) may be operatively coupled with such a stacked lightguide, thus allowing for a lighting panel/fixture having a substantially higher light output as compared with existing designs/approaches.

As will be appreciated in light of this disclosure, and in accordance with an embodiment, a wide variety of lighting fixtures/devices (e.g., panels, bulbs, tubes, rings, containers, three-dimensional structures/sculptures, etc.) can be produced using the disclosed techniques. Also, and in accordance with an embodiment, the disclosed techniques can be used in any of a wide variety of lighting applications (e.g., office lighting, commercial lighting, signage lighting, display backlighting, etc.). Other suitable uses of the disclosed techniques will be apparent in light of this disclosure.

Light Extraction Techniques

In accordance with an embodiment of the present invention, the disclosed techniques can be used to provide a lightguide with one or more internal light extraction features. For example, consider FIGS. 1A and 1B, which are a perspective view and a side view, respectively, of a lightguide 110 configured with internal light extraction features 150, in accordance with an embodiment of the present invention. As used herein, an internal light extraction feature 150 may comprise, for example, a material and/or a structure that is formed, deposited, or otherwise provided completely within the interior of a lightguide 110 (e.g., enclosed by or otherwise not exposed at a surface of the lightguide 110). As will be appreciated in light of this disclosure, an internal light extraction feature is distinct from a surficial light extraction feature 140, discussed below with reference to FIGS. 2A-2B. As will be further appreciated in light of this disclosure, lightguide 110 may include additional, fewer, and/or different elements or components from those here described (e.g., reflectors, diffusers, films, polarizers, other optical components, etc.), and the claimed invention is not intended to be limited to any particular lightguide 110 configurations, but can be used with numerous configurations in numerous applications.

In accordance with an embodiment, the disclosed techniques can be used with a wide variety of lightguide materials. For instance, lightguide 110 may comprise a bulk/quantity of optical material having the ability: (1) to be configured for total internal reflection (TIR) of light coupled therein (e.g., provided by one or more light sources 130, discussed below); and/or (2) to transmit/emit the wavelength(s) of interest (e.g., visible, ultraviolet, infrared, etc.) of the light coupled therein. In some example embodiments, lightguide 110 may be constructed from or otherwise include a transparent solid, such as, but not limited to: (1) a transparent plastic or other polymer, such as poly(methyl methacrylate) (PMMA), polycarbonate, etc.; (2) a transparent ceramic, glass, or other crystal, such as sapphire ($Al_2O_3$), yttrium aluminum garnet (YAG), etc.; (3) a combination of the aforementioned; and/or (4) any other optical material suitable for a lightguide. It should be noted, however, that the claimed invention is not so limited, as in some other example embodiments, lightguide 110 may be constructed from or otherwise include: (1) a transparent liquid (e.g., oil, water, a solvent, liquid crystals, etc.); (2) a transparent gas (e.g., air, nitrogen, carbon dioxide, etc.); and/or (3) vacuum. In some instances, a given lightguide 110 may comprise a single material, while in some other instances multiple materials may be utilized for a given lightguide 110. Also, in some cases, lightguide 110 may be configured as a partially or wholly hollow structure (e.g., constructed from one or more of the aforementioned optical materials) having provided therein one or more of the aforementioned optical materials. In some cases, lightguide 110 also optionally may have one or more optical and/or protective coatings (e.g., anti-reflective, diffractive, etc.) disposed thereon. Other suitable materials and/or coatings for lightguide 110 will depend on a given application and will be apparent in light of this disclosure.

Figure 7A:
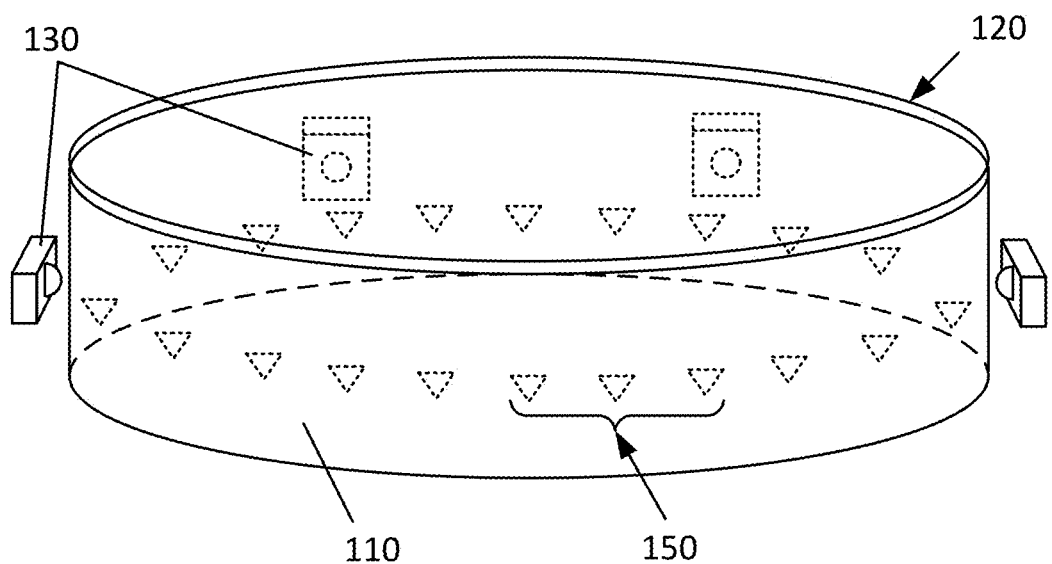
FIGS. 7A and 7B are a perspective view and a side view, respectively, of a round/elliptical lightguide configured in accordance with an embodiment of the present invention.
Figure 7B:
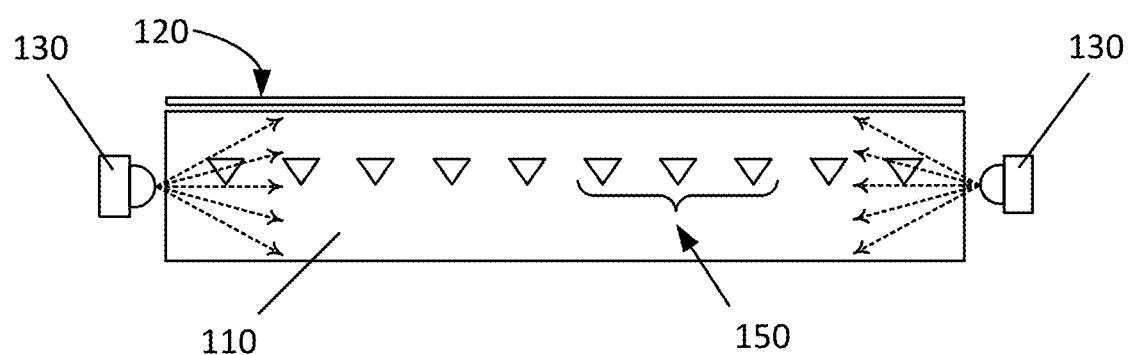
Figure 8A:
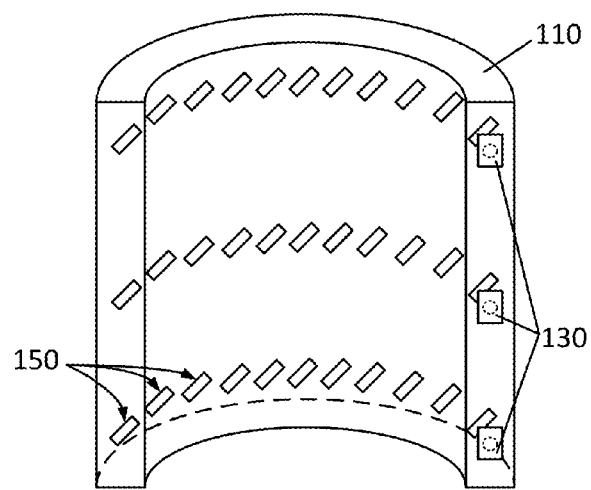
FIGS. 8A and 8B are a perspective view and a cross-sectional side view, respectively, of a curved lightguide configured in accordance with an embodiment of the present invention.
Figure 8B:
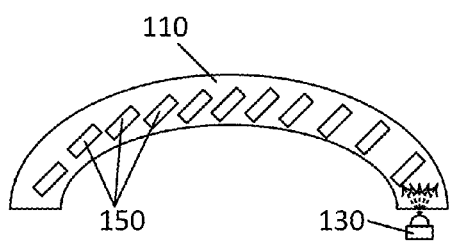
Figure 9:
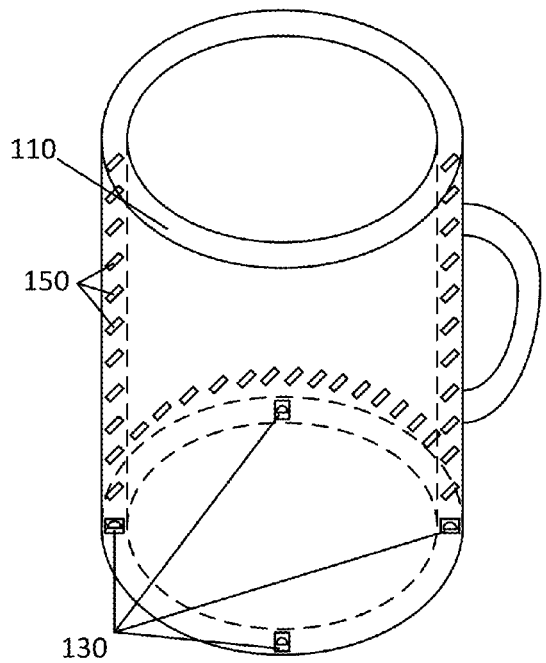
FIG. 9 is a perspective view of a custom three-dimensional lightguide configured in accordance with an embodiment of the present invention.
Figure 15A:
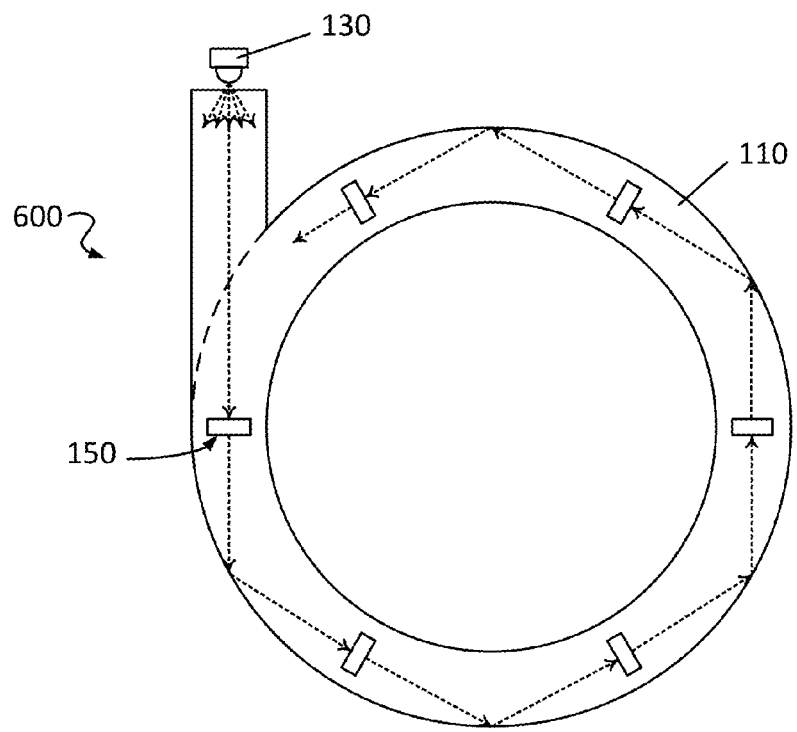
FIGS. 15A and 15B are a top-down view and a side view, respectively, of a light ring configured in accordance with an embodiment of the present invention.
Figure 15B:
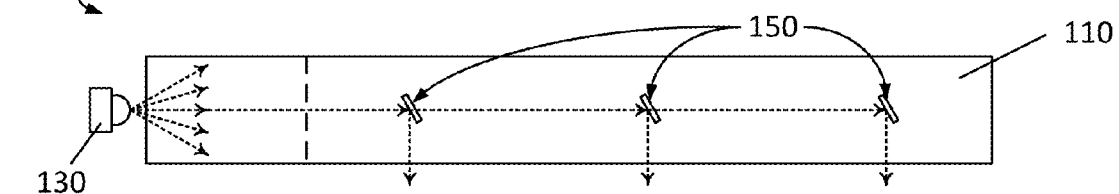

Also, and in accordance with an embodiment of the present invention, the disclosed techniques can be used with a wide variety of lightguide geometries/shapes. For instance, lightguide 110 may be configured as any three-dimensional structure, including: (1) a square/rectangular plate (such as is illustrated in FIGS. 1A-1B); (2) a circular/elliptical plate (such as is illustrated in FIGS. 7A-7B); (3) a ring (such as is illustrated in FIGS. 15A-15B); (4) a spiral; (5) a helix, (6) an oval; (7) a wave; (8) a star; and/or (9) any custom three-dimensional structure (e.g., a container, such as is illustrated in FIG. 9). Furthermore, and in accordance with an embodiment, lightguide 110 can be configured as a substantially planar structure or as a curved, rounded, or otherwise non-planar structure (e.g., such as is illustrated in FIGS. 8A-8B). Still further, the dimensions (e.g., length, width/diameter, height, etc.) of lightguide 110 can be customized for a given application. Other suitable geometries/shapes and/or dimensions for lightguide 110 will depend on a given application and will be apparent in light of this disclosure.

As previously noted, and in accordance with an embodiment, the disclosed techniques can be used to provide a given lightguide 110 with a wide variety of internal light extraction features 150. In some embodiments, a given internal light extraction feature 150 can be configured as a substantially two-dimensional feature, such as a dot or other quantity of material (e.g., a reflective paint, a phosphor, a liquid, etc.). In some other embodiments, a given internal light extraction feature 150 can be a three-dimensional feature/structure (e.g., a geometric structure, a void or hollow, a depression or other formation, etc.). In some still other embodiments, the internal light extraction features 150 may comprise a grouping or collection of embedded scattering particles deposited or otherwise provided within lightguide 110.

In accordance with an embodiment, internal light extraction features 150 may comprise a wide range of materials. For instance, one or more internal light extraction features 150 may comprise: (1) a gas (e.g., air, nitrogen, carbon dioxide, or other gases); (2) a liquid (e.g., oil, water, a solvent, liquid crystals, etc.); (3) a solid (e.g., a ceramic, a metal, crystals, a glass, a plastic, etc.); (4) vacuum; (5) a phosphor; (6) a quantum dot; (7) combinations of any of the aforementioned; and/or (8) any other suitable material that can be used to extract light from within a lightguide. Thus, as will be appreciated, in some instances a given internal light extraction feature 150 may comprise a material of different refractive index from that of lightguide 110. In accordance with an embodiment, the disclosed techniques can be used to provide internal light extraction features 150 having a wide range of refractive index changes (e.g., a difference in the range of about zero to 1.5) as compared to the refractive index of the material which comprises lightguide 110. Other suitable materials and/or refractive index ranges will depend on a given application and will be apparent in light of this disclosure.

Also, and in accordance with an embodiment, the disclosed techniques can be used to provide a given lightguide 110 with internal light extraction features 150 having any of a wide variety of geometries/shapes. For instance, and in accordance with some specific example embodiments, one or more internal light extraction features 150 may be configured as a two-dimensional shape (e.g., a rectangle, square, hexagon, or any other polygon; an ellipse/circle or any other curved/rounded shape; and/or a combination of the aforementioned). Furthermore, and in accordance with some specific example embodiments, one or more internal light extraction features 150 may be configured as a three-dimensional shape (e.g., a plate, box, cube, prism, or other polyhedron; a disk, cylinder, ring, ellipsoid, sphere, toroid, or other curved shape; a cone, pyramid, or other tapered shape; a conical frustum, pyramidal frustum, or other frustum shape; and/or a combination of the aforementioned). Still further, and in accordance with an embodiment, a given internal light extraction feature 150 can be of any desired size (e.g., ranging from a few nanometers to meters or greater). In some cases, the internal light extraction features 150 may be configured, for example, as photonic crystals or other fine structures. Other suitable shapes/geometries and/or sizes for internal light extraction features 150 will depend on a given application and will be apparent in light of this disclosure.

In accordance with an embodiment, the distribution (e.g., density, pattern/periodicity, etc.) of internal light extraction features 150 can be varied within lightguide 110. For example, in some instances, lightguide 110 can be configured with one or more regions (e.g., emitting regions) having internal light extraction features 150, as well as with one or more regions (e.g., non-emitting regions) which do not have internal light extraction features 150. As will be appreciated, and in accordance with an embodiment, the emitting and non-emitting regions of lightguide 110 can be adjusted as desired to achieve a wide range of lighting effects from lightguide 110 (e.g., color mixing, as discussed below with reference to FIGS. 5A-5B; display of patterns, pictures, characters, words, etc., as discussed below).

In accordance with an embodiment, a wide variety of techniques/processes may be used to form, deposit, or otherwise provide the internal light extraction features 150 within a given lightguide 110. For instance, and in accordance with one specific example embodiment, a lightguide 110 may be provided with internal light extraction features 150 using three-dimensional printing of transparent materials (e.g., transparent plastics/polymers). In another specific example embodiment, a lightguide 110 may be provided with internal light extraction features 150 by stacking multiple constituent layers of the lightguide 110, wherein one or more of the constituent layers have the desired internal light extraction features 150 therein/thereon. The individual constituent layers of such a lightguide 110 can be formed by any of a wide variety of techniques/processes including, but not limited to, machining, extrusion, injection molding, and/or other suitable processes. To form the multi-layered lightguide 110 (having the internal light extraction features 150), the individual constituent layers can be arranged (e.g., by stacking) and operatively coupled with one another using, for example, a suitable adhesive material and/or by other suitable process/material.

In still another specific example embodiment, a laser or other optical beam can be used to form (e.g., by cutting, etching, or other laser-based processing, etc.) internal light extraction features 150 within, for instance, a lightguide 110 comprising a transparent material (e.g., a transparent plastic/polymer). The laser/optical beam can be focused at different positions/depths of lightguide 110 to produce internal light extraction features 150 locally. In yet some other specific example embodiments, techniques/processes such as extrusion, injection molding, and/or embossment may be used to form internal light extraction structures 150 (e.g., prisms, cylinders, etc.) within, for instance, a lightguide 110 comprising a transparent plastic such as poly(methyl methacrylate) (PMMA). Other techniques/approaches suitable for providing a given lightguide 110 with one or more internal light extraction features 150 (e.g., materials and/or structures) will depend on a given application and will be apparent in light of this disclosure.

As will be appreciated, and in accordance with an embodiment, a very large variety of lightguides 110 having a wide variety of internal light extraction features 150 can be provided using the disclosed techniques. For instance, in one specific example embodiment, the disclosed techniques may be used to provide a lightguide 110 comprising glass or PMMA and having internal light extraction features 150 comprising liquid crystals. In another specific example embodiment, the disclosed techniques can be used to provide a lightguide 110 comprising liquid oil and having internal light extraction features 150 comprising one or more metals. Numerous other configurations of a lightguide 110 with internal light extraction features 150 are possible, as will be appreciated in light of this disclosure.

As previously noted, and in accordance with an embodiment of the present invention, the disclosed techniques can be used to provide a lightguide 110 with both internal light extraction features 150 and surficial light extraction features 140. For example, consider FIGS. 2A and 2B, which are a perspective view and a side view, respectively, of a lightguide 110 configured with internal light extraction features 150 and surficial light extraction features 140, in accordance with an embodiment of the present invention. As can be seen, a lightguide 110 may be provided with one or more surficial light extraction features 140 (e.g., a surface texture) on one or more of its surfaces. Also, as can be seen, such surficial light extraction features 140 are physically distinct from any internal light extraction features 150. As will be appreciated in light of this disclosure, and in accordance with an embodiment, any of the materials, geometries/shapes, and/or techniques/processes described above with reference to the internal light extraction features 150 applies equally as well here with respect to the surficial light extraction features 140.

In some cases, and in accordance with an embodiment, a given lightguide 110 can be provided with zoned or otherwise grouped internal light extraction features 150. For example, consider FIGS. 3A and 3B, which are a perspective view and a side view, respectively, of a lightguide 110 having a plurality of zones of internal light extraction features 150, in accordance with an embodiment of the present invention. As can be seen, lightguide 110 can be configured with one or more zones (e.g., Zones A, B, C, etc.), each zone having a grouping of internal light extraction features 150a, 150b, etc. In some cases, two or more zones may have similarly configured internal light extraction features 150, while in some other cases all zones may have uniquely configured internal light extraction features 150. As will be appreciated, and in accordance with an embodiment, any quantity of zones can be designated, and the zones can be of any desired dimensions (e.g., equal or varied proportionalities of lightguide 110). Furthermore, the density of internal light extraction features 150 may be varied (e.g., uniform, non-uniform, etc.) within a given zone and/or across one or more zones.

In much the same manner, and in accordance with an embodiment, a given lightguide 110 can be provided with zoned or otherwise grouped surficial light extraction features 140, as well. For example, consider FIGS. 4A and 4B, which are a perspective view and a side view, respectively, of a lightguide 110 having a plurality of zones of internal light extraction features 150 and surficial light extraction features 140, in accordance with an embodiment of the present invention. As can be seen, some zones of lightguide 110 can include a grouping of internal light extraction features 150 while some other zones of lightguide 110 can include a grouping of surficial light extraction features 140. In some cases, a given zone may include only internal light extraction features 150 or only surficial light extraction features 140, while in some other cases a given zone may include both internal light extraction features 150 and surficial light extraction features 140. Again, any quantity of zones can be designated, the zones may be of any desired dimensions (e.g., equal or varied proportionalities of lightguide 110), and the density of internal light extraction features 150 and/or surficial light extraction features 140 may be varied within a given zone and/or across one or more zones.

Figure 5B:
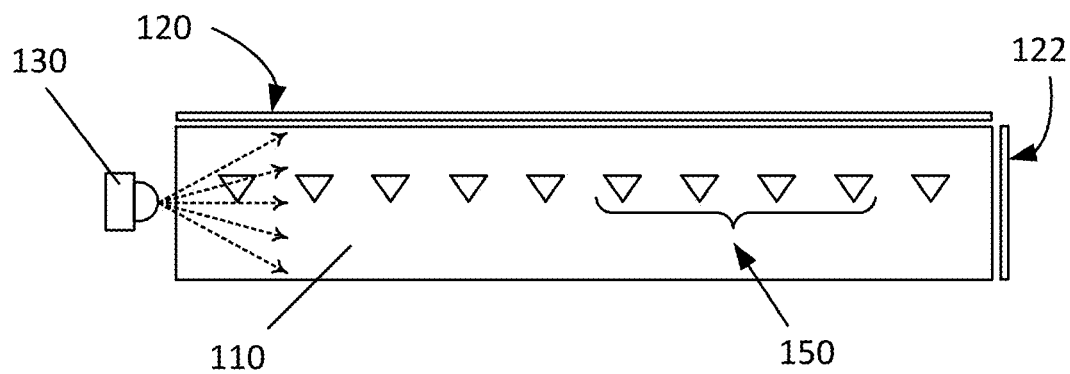

FIGS. 5A and 5B are a perspective view and a side view, respectively, of a lightguide 110 configured in accordance with an embodiment of the present invention. As can be seen, one or more light sources 130 may be operatively coupled with lightguide 110 and configured to emit/couple light therein. The one or more light sources 130 may be of any desired spectral emission band (e.g., visible spectral band, infrared spectral band, ultraviolet spectral band, etc.) suitable for a given application. In some cases, light source(s) 130 may comprise one or more light emitting diodes (LEDs). In some instances, multiple-color LED light sources 130 can be used, for example, for color mixing within lightguide 110. In some such cases in which color mixing is desired, non-emitting regions (discussed above) of lightguide 110 can be used to achieve good color mixing within such lightguide 110. Other suitable types of light sources 130 will depend on a given application and will be apparent in light of this disclosure.

Figure 6A:
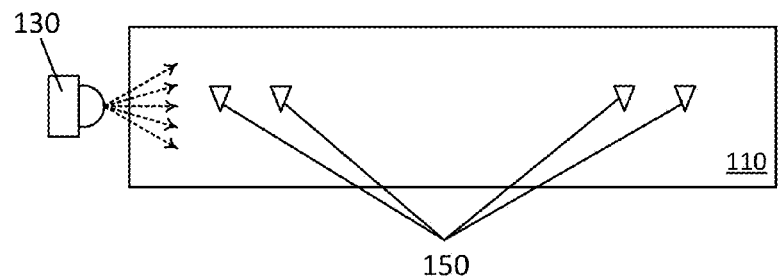
FIG. 6A is a side view of a lightguide configured for direct light coupling, in accordance with an embodiment of the present invention.

In accordance with an embodiment, light provided by the one or more light sources 130 can be coupled into lightguide 110 by any of a wide variety of light coupling means/mechanisms. For example, consider FIG. 6A, which is a side view of a lightguide 110 configured for direct light coupling, in accordance with an embodiment of the present invention. As can be seen, a lightguide 110 with internal light extraction features 150 provided using the disclosed techniques can have one or more light sources 130 (e.g., LEDs) operatively coupled thereto (e.g., physically coupled with an input surface/edge of lightguide 110; disposed sufficiently proximate to, but separate from, an input surface/edge of lightguide 110; etc.) and configured to direct/emit light therein.

Figure 6B:
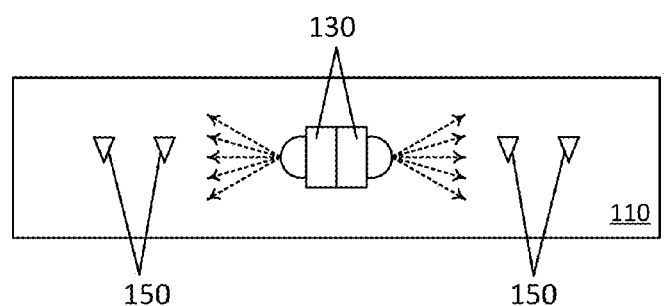
FIG. 6B is a side view of a lightguide configured for internal light coupling, in accordance with an embodiment of the present invention.

As a further example, consider FIG. 6B, which is a side view of a lightguide 110 configured for internal light coupling, in accordance with an embodiment of the present invention. As can be seen, a lightguide 110 with internal light extraction features 150 provided using the disclosed techniques can have one or more light sources 130 (e.g., LEDs) embedded therein and configured to direct/emit light therein.

Figure 6C:
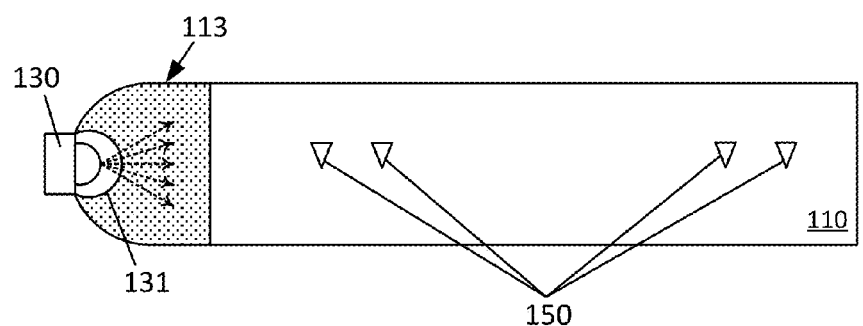
FIG. 6C is a side view of a lightguide configured for TIR lens light coupling, in accordance with an embodiment of the present invention.

As still a further example, consider FIG. 6C, which is a side view of a lightguide 110 configured for TIR lens light coupling, in accordance with an embodiment of the present invention. As can be seen, a lightguide 110 with internal light extraction features 150 provided using the disclosed techniques can include a coupling region 113 (discussed below) provided therewith (e.g., at an edge or surface), and one or more light sources 130 (e.g., LEDs) can be disposed within or otherwise operatively coupled with such coupling region 113 and configured to direct/emit light into lightguide 110 using, for example, a TIR lens 131.

Figure 6D:
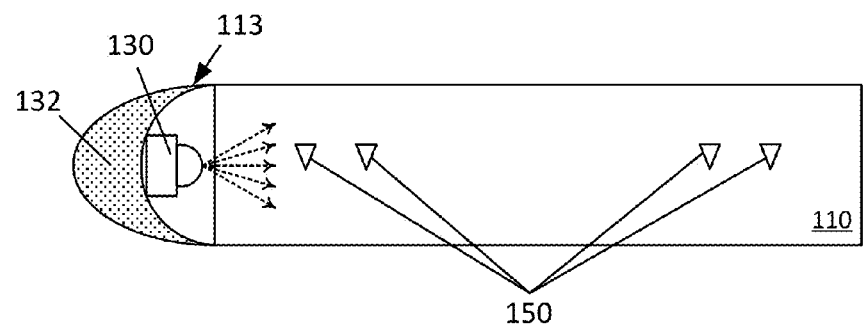
FIG. 6D is a side view of a lightguide configured for reflector-based light coupling, in accordance with an embodiment of the present invention.

As yet a further example, consider FIG. 6D, which is a side view of a lightguide 110 configured for reflector-based light coupling, in accordance with an embodiment of the present invention. As can be seen, a lightguide 110 with internal light extraction features 150 provided using the disclosed techniques can include a coupling region 113, and one or more light sources 130 (e.g., LEDs) can be disposed therein or otherwise operatively coupled therewith and configured to direct/emit light into lightguide 110 using, for example, a reflector 132.

In each of the example configurations noted above with reference to FIGS. 6A-6D, the light coupled into lightguide 110 may be retained thereby until it is sufficiently incident upon an internal light extraction feature 150 (and/or surficial light extraction feature 140, when included) and extracted thereby from within lightguide 110. Other suitable configurations for coupling light into a lightguide 110 having one or more internal light extraction features 150 as described herein will depend on a given application and will be apparent in light of this disclosure. For instance, in one specific example embodiment, lightguide 110 may be configured as a bottom-lit lightguide (e.g., as opposed to an edge-lit lightguide), wherein the one or more light sources 130 are operatively coupled with a bottom surface thereof and configured to couple light therein by a reflector.

As can further be seen from FIGS. 5A-5B, and in accordance with an embodiment, lightguide 110 optionally may include a back reflector 120 and/or one or more side reflectors 122 on one or more of its surfaces. When included, a given reflector 120/122 may comprise a highly reflective metal film/layer such as: (1) aluminum (Al); (2) gold (Au); (3) silver (Ag); and/or (4) any other suitably reflective material which may be implemented with lightguide 110. In some cases, the material used for a given reflector 120/122 may be chosen, at least in part, based on its ability to reflect the wavelength(s) of interest of the light (e.g., visible, ultraviolet, infrared, etc.) provided by the one or more light sources 130. Furthermore, and in accordance with an embodiment, it may be desirable to ensure that a given reflector 120/122, when included, is implemented sufficiently proximate to the desired surface (e.g., such that the gap therebetween is in the range of a few micrometers to a few millimeters) to ensure a sufficient amount of reflection. However, and in accordance with an embodiment, optional back reflector 120 and/or optional side reflector(s) 122 may be omitted in some cases, for instance: (1) to permit light to be extracted and emitted, for example, through multiple surfaces of lightguide 110 (e.g., discussed below with reference to FIGS. 11A-11B); and/or (2) to allow for a light-transmissive (e.g., transparent or semi-transparent) lightguide 110, as previously noted.

As will be appreciated in light of this disclosure, and in accordance with an embodiment, the disclosed techniques can be implemented with curved/rounded lightguides (and/or any other lightguide configuration/structure) as well. For example, consider FIGS. 7A and 7B, which are a perspective view and a side view, respectively, of a round/elliptical lightguide 110 configured in accordance with an embodiment of the present invention. As a further example, consider FIGS. 8A and 8B, which are a perspective view and a cross-sectional side view, respectively, of a curved lightguide 110 configured in accordance with an embodiment of the present invention. As can be seen in these example configurations, a curved/rounded lightguide 110 can be provided with one or more internal light extraction features 150 and, in some specific example instances, optionally may include a back reflector 120.

As yet a further example, consider FIG. 9, which is a perspective view of a custom three-dimensional lightguide 110 configured in accordance with an embodiment of the present invention. In the specific example embodiment depicted, lightguide 110 has been configured as a container (e.g., a mug, a cup, a tankard, etc.). However, the claimed invention is not so limited, and any number of various custom three-dimensional structures (e.g., fish tank, bowl, sculpture, statue, etc.) can be configured with a lightguide 110 having one or more internal light extraction features 150. Furthermore, and in accordance with an embodiment, such custom structures can be illuminated from the inside while being transparent/semi-transparent.

As will be appreciated, and in accordance with an embodiment, each of the example configurations of FIGS. 7A-7B, 8A-8B, and 9 also may include one or more surficial light extraction features 140, as previously discussed.

Lighting Fixtures and Devices

Figure 10A:
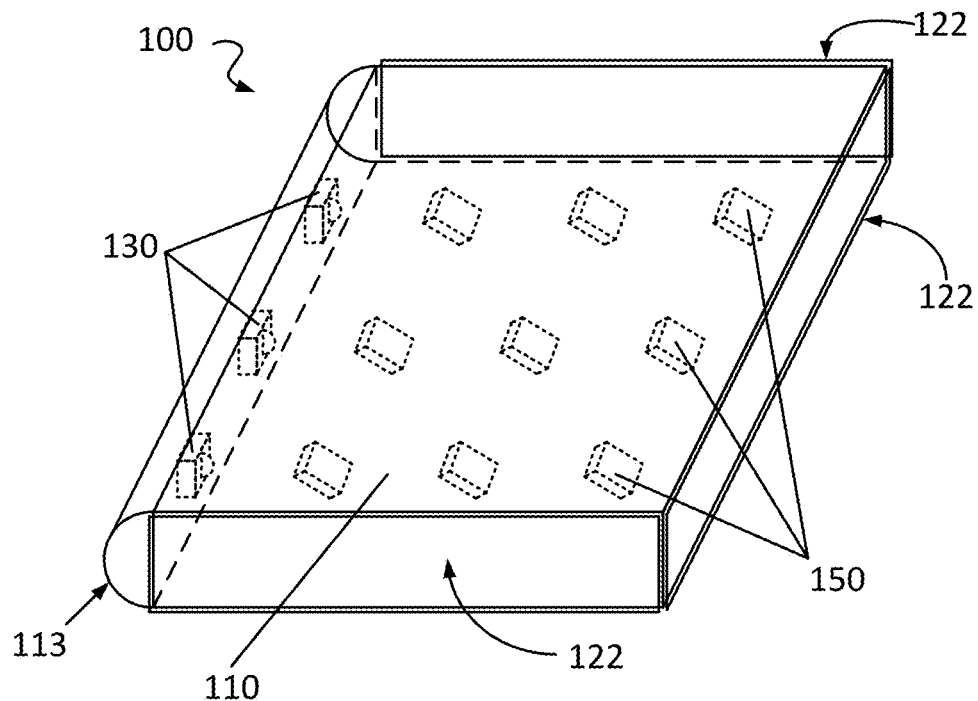
FIGS. 10A and 10B are a perspective view and a cross-sectional side view, respectively, of a lighting panel/fixture configured in accordance with an embodiment of the present invention.

In accordance with an embodiment of the present invention, the disclosed techniques can be used to provide a wide variety of lighting fixtures and devices. For example, consider FIGS. 10A and 10B, which are a perspective view and a cross-sectional side view, respectively, of a lighting panel/fixture 100 configured in accordance with an embodiment of the present invention. As can be seen, lighting panel/fixture 100 may include a lightguide 110 having one or more internal light extraction features 150 provided using the disclosed techniques. One or more light sources 130 (e.g., LEDs) may be operatively coupled with an input edge/surface of lightguide 110 and, in some example instances, may be implemented within or otherwise operatively coupled with an optional coupling region 113. Optional coupling region 113, when included, may be constructed with any one or more of the optical materials discussed above in the context of lightguide 110 (e.g., plastic, glass, epoxy, etc.). Also, one or more optional side reflectors 122 may be implemented with lightguide 110.

Figure 10B:
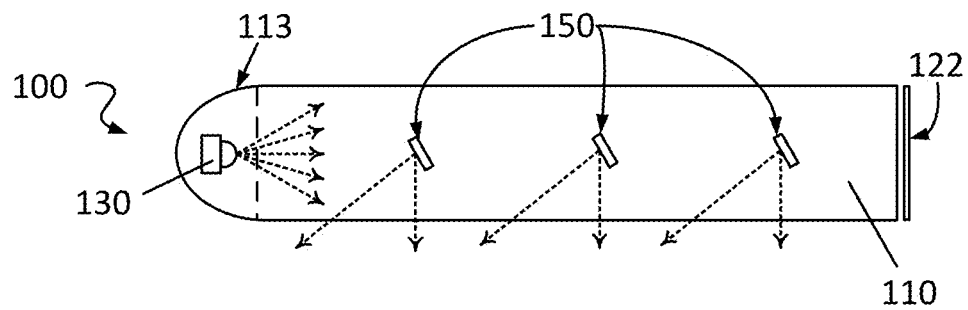

As can be seen with particular reference to FIG. 10B, the internal light extraction features 150 can be configured, in accordance with an embodiment, to extract light from within lightguide 110 and to direct the outbound light through a single side thereof (e.g., through a single output surface). In the specific example embodiment depicted, lightguide 110 includes a plurality of plate-type internal light extraction features 150 which are oriented parallel to one another and tilted or otherwise off-set to direct incident light through a single output surface of lightguide 110. Thus, and in accordance with an embodiment, lighting panel/fixture 100 is configured to achieve single-sided emission (e.g., no light or an otherwise negligible amount of light escapes through a back surface of lightguide 110) without use of a back reflector 120.

As a further example, consider FIGS. 11A and 11B, which are a perspective view and a cross-sectional side view, respectively, of a lighting panel/fixture 200 configured in accordance with an embodiment of the present invention. As can be seen, lighting panel/fixture 200 is configured in much the same manner as lighting panel/fixture 100 (discussed above). However, with lighting panel/fixture 200, the internal light extraction features 150 are configured to extract light from within lightguide 110 and to direct the outbound light through multiple sides thereof (e.g., through two or more output surfaces). In the specific example embodiment shown, lightguide 110 includes a plurality of plate-type internal light extraction features 150, a first grouping of which is oriented parallel one another and tilted or otherwise off-set to direct incident light through a first output surface of lightguide 110, while a second grouping of which is similarly configured to direct incident light through a second output surface of lightguide 110. Thus, and in accordance with an embodiment, lighting panel/fixture 200 is configured to achieve double-sided emission. As will be appreciated, it may be desirable in some instances to omit a back reflector 120 from lighting panel/fixture 200 to maintain a double-sided emission configuration.

As previously noted, omission of a back reflector 120 may allow for a transparent lightguide 110 (e.g., fully transparent or semi-transparent) and thus allow for a lighting panel/fixture 100/200 that is light-transmissive (e.g., when light sources 130 are off) and can be used in conjunction with a light source besides the one or more light sources 130. For instance, in some cases ambient light, sunlight, etc., may be permitted to pass through lightguide 110 (and thus through lighting panel/fixture 100/200), allowing lighting panel/fixture 100/200 to function, for example, as both a window and a lighting fixture. During the daytime or when there is otherwise sufficient outside/ambient light, light sources 130 may be turned off, and light from the sun or some other external light source may be permitted to pass through the lightguide 110, much like a window. At night or when there is otherwise insufficient outside/ambient light, light sources 130 may be turned on, and the lightguide-window may function as a lighting fixture. However, as will be appreciated, a given lighting panel/fixture 100/200 is not precluded from implementing a back reflector 120 and may include one in some instances.

As will be further appreciated in light of this disclosure, and in accordance with an embodiment, provision of a transparent/semi-transparent lightguide 110 (e.g., such as by omission of a back reflector 120, a side reflector 122, etc.) may allow for formation of a multiple-layer lightguide 110' and/or multiple-section lightguide 110", each discussed below. For example, consider FIG. 12A, which is a perspective view of a lighting panel/fixture 300a, configured in accordance with an embodiment of the present invention. As can be seen, a plurality of individual lightguides 110 (e.g., transparent or semi-transparent) can be operatively coupled in a stacked arrangement to provide a multi-layer lightguide 110'. In some cases, the stacked arrangement may be configured, for example, with neighboring lightguides 110 which are in physical contact with one another (e.g., contiguous, flush, etc.). In some other example cases, the stacked arrangement may be configured with neighboring lightguides 110 having a sufficiently small space/void therebetween such that they are independent of one another. In some still other example cases, the stacked arrangement may be configured with neighboring lightguides 110 that have a sufficient quantity of bulk optical material therebetween such that the individual lightguides 110 are effectively independent of one another.

Furthermore, note that in some instances the pattern of internal light extraction features 150 and/or surficial light extraction features 140 of one lightguide 110 may be sufficiently proximate to the pattern of internal light extraction features 150 and/or surficial light extraction features 140 of an adjacent lightguide 110 so as to effectively provide a continuous pattern of internal light extraction features 150 and/or surficial light extraction features 140 shared thereby. In some other instances, the pattern of internal light extraction features 150 and/or surficial light extraction features 140 of one lightguide 110 may exist independently of or otherwise be distinct from the pattern of internal light extraction features 150 and/or surficial light extraction features 140 of an adjacent lightguide 110. Also, whether implemented in a continuous or independent fashion, the pattern of internal light extraction features 150 and/or surficial light extraction features 140 of the various stacked lightguides 110 of multi-layered lightguide 110' may be the same or different. In some cases, one or more portions of the multi-layer lightguide 110' may include a continuous pattern of internal light extraction features 150 and/or surficial light extraction features 140, while one or more other portions thereof may include independent patterns of internal light extraction features 150 and/or surficial light extraction features 140. Numerous variations on stacked configurations will be apparent in light of this disclosure. Using the techniques disclosed herein, the multiple lightguide 110 layers of multi-layer lightguide 110' can be stacked together with a minimal or otherwise negligible loss in optical efficiency, in accordance with an embodiment.

In some cases, multiple layers of light sources 130 (e.g., LEDs) can be operatively coupled with the constituent lightguides 110 of stacked lightguide 110' to provide a very bright lighting panel/fixture 300a. As will be appreciated, and in accordance with an embodiment, any of the aforementioned light coupling techniques discussed above with reference to FIGS. 6A-6D can be used here for coupling light into a given constituent lightguide 110.

In accordance with an embodiment, the maximum quantity of light sources 130 (e.g., LEDs) which may be operatively coupled with stacked lightguide 110' may be limited only by the area of the edges/sides of the lighting panel/fixture 300a and thus may be substantially higher than the limited quantity that can be achieved with existing designs (as previously noted). Thus, within the same area constraints, a high intensity light panel/fixture 300a which is many times more luminous than existing approaches/designs can be provided.

However, the claimed invention is not limited to only vertically layered/stacked configurations. For example, consider FIG. 12B, which is a perspective view of a lighting panel/fixture 300b, configured in accordance with an embodiment of the present invention. As can be seen, a plurality of individual lightguides 110 (e.g., transparent or semi-transparent) can be operatively coupled in a laterally adjacent arrangement to provide a multi-sectioned lightguide 110". In some cases, the lateral arrangement may be configured, for example, with neighboring lightguides 110 which are in physical contact with one another (e.g., contiguous, flush, etc.). In some other example cases, the lateral arrangement may be configured with neighboring lightguides 110 having a sufficiently small space/void therebetween such that they are independent of one another. In some still other example cases, the lateral arrangement may be configured with neighboring lightguides 110 that have a sufficient quantity of bulk optical material therebetween such that the individual lightguides 110 are effectively independent of one another.

Figure 12A:
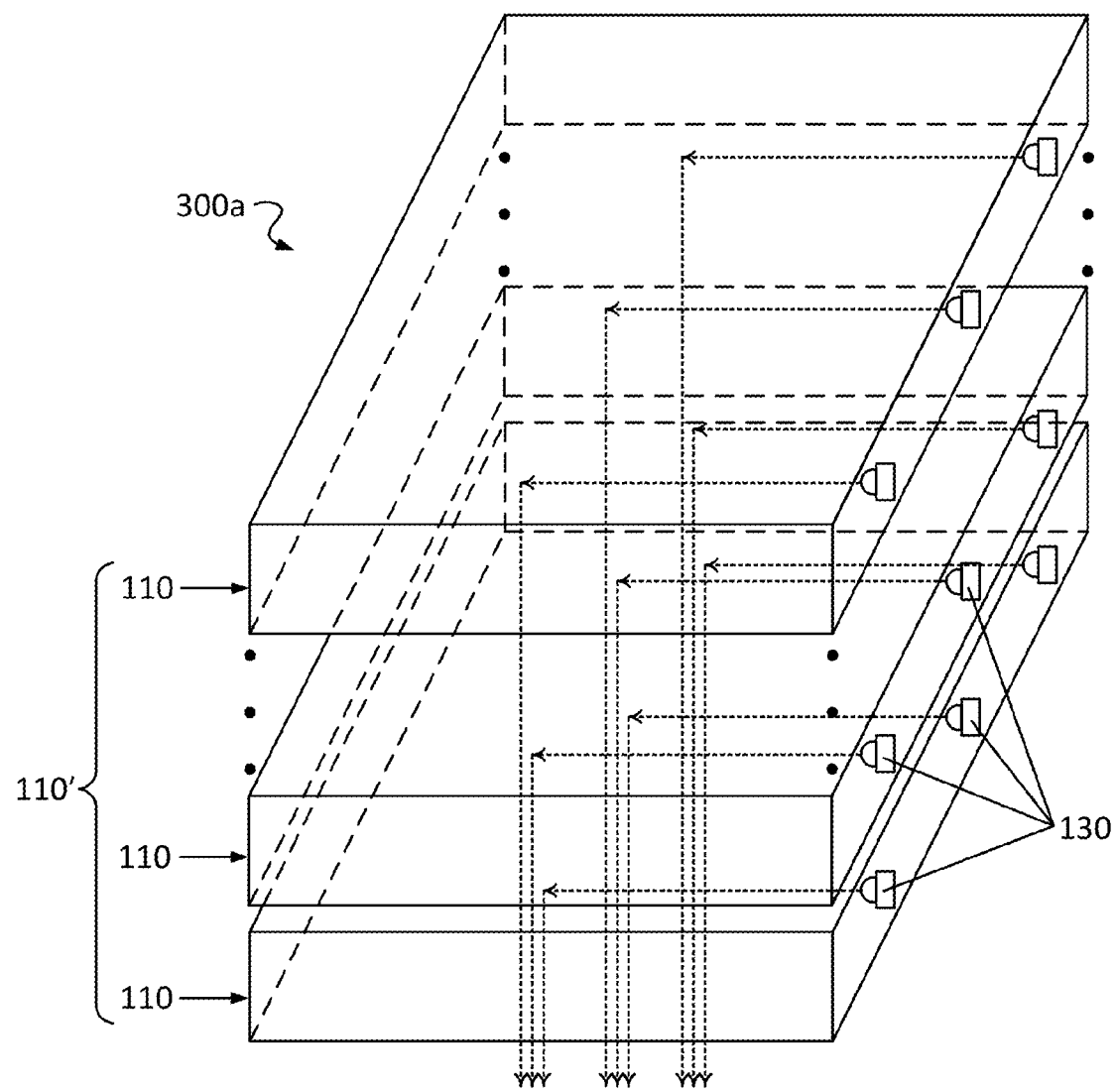
FIG. 12A is a perspective view of a lighting panel/fixture, configured in accordance with an embodiment of the present invention.

Furthermore, note that the previous discussion in the context of FIG. 12A with regard to continuous and independent patterns of internal light extraction features 150 and/or surficial light extraction features 140 is equally applicable here. Using the techniques disclosed herein, the multiple lightguides 110 can be arranged proximate one another (e.g., substantially flush with one another or otherwise acceptably proximate or distanced from one another) with a minimal or otherwise negligible loss in optical efficiency, in accordance with an embodiment. In some example cases, the edges between any two constituent lightguides 110 of a multi-sectioned lightguide 110" may be substantially invisible (or otherwise negligibly visible).

In some cases, multiple light sources 130 (e.g., LEDs) can be operatively coupled with the constituent lightguides 110 of multi-sectioned lightguide 110" to provide a large area (or otherwise modular) lighting panel/fixture 300b. In accordance with an embodiment, multiple lightguides 110 can be horizontally or otherwise laterally assembled/disposed to form a multi-sectioned lightguide 110" with multiple sections/modules of light sources 130. By virtue of such a modular capability, in some instances, a plurality of lightguides 110 may be operatively coupled to form a desired/customized large area lighting panel/fixture 300b. In some cases, and in accordance with an embodiment, a multi-sectioned lightguide 110" may be configured to function much like a single large lightguide 110 with embedded light sources 130. As will be appreciated, and in accordance with an embodiment, any of the aforementioned light coupling techniques discussed above with reference to FIGS. 6A-6D can be used here for coupling light into a given constituent lightguide 110.

As will be appreciated in light of this disclosure, and in accordance with an embodiment, the lightguides 110 of lighting panels/fixtures 100, 200, 300a, and/or 300b can be provided with internal light extraction features 150 using any of the processes/techniques discussed above with reference to FIGS. 1A-1B.

Figure 13:
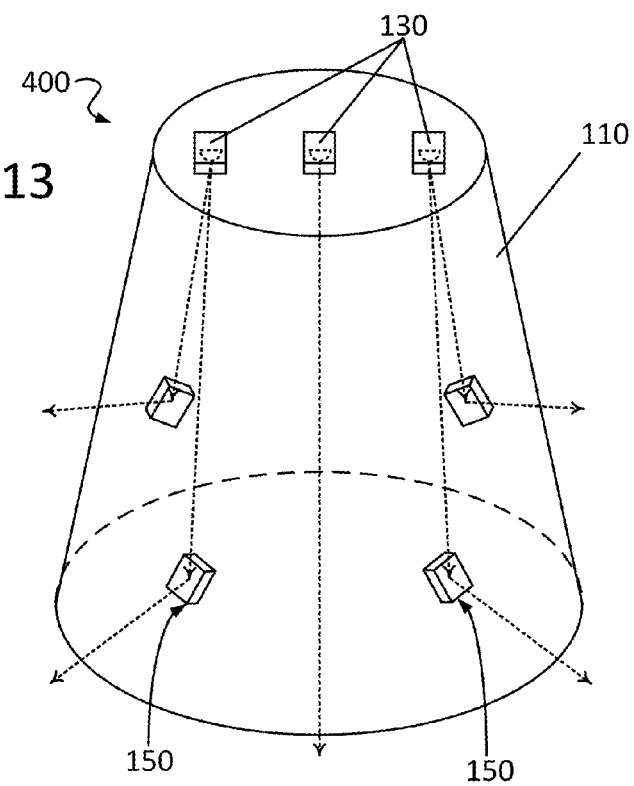
FIG. 13 is a perspective view of a light bulb configured in accordance with an embodiment of the present invention.
Figure 14:
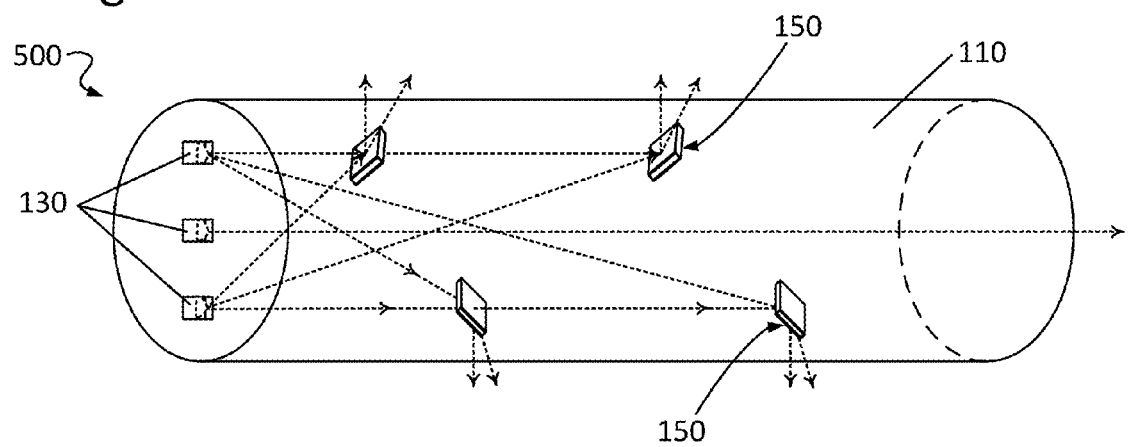
FIG. 14 is a perspective view of a light tube configured in accordance with an embodiment of the present invention.

In accordance with an embodiment, the disclosed techniques can be used to provide a wide variety of lighting devices. For example, consider FIG. 13, which is a perspective view of a light bulb 400 configured in accordance with an embodiment of the present invention. As a further example, consider FIG. 14, which is a perspective view of a light tube 500 configured in accordance with an embodiment of the present invention. As yet a further example, consider FIGS. 15A and 15B, which are a top-down view and a side view, respectively, of a light ring 600 configured in accordance with an embodiment of the present invention. Other lighting devices (e.g., three-dimensional lighting devices) which may be provided using the disclosed techniques will be apparent in light of this disclosure.

As can be seen in each of these example embodiments, the individual example lighting device (e.g., light bulb 400, light tube 500, light ring 600) includes a lightguide 110 having one or more internal light extraction features 150 provided using the disclosed techniques. Light may be coupled into the various lightguides 110 of such example lighting devices using any of the techniques described above with reference to FIGS. 6A-6D (e.g., direct, embedded, TIR lens, reflector, etc.). Also, it should be noted that while each of the specific example embodiments shown in FIGS. 13, 14, and 15A-15B depicts light sources 130 placed only at a single location/position with respect to a given lightguide 110, there are no limitations to placing one or more light sources 130 at different and/or additional locations (e.g., sides, surfaces, edges, layers, etc.) of a given lightguide 110 of a given lighting device (e.g., light bulb 400, light tube 500, light ring 600).

Other Techniques

Figure 16A:
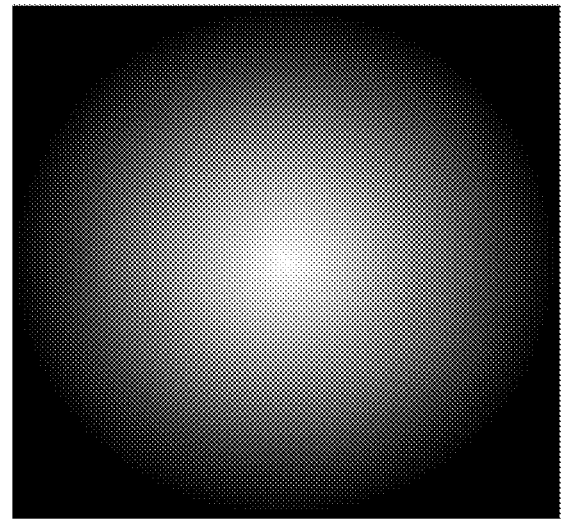
FIG. 16A illustrates an example luminance intensity distribution on the surface of a lightguide configured in accordance with an embodiment of the present invention.

In accordance with an embodiment, the disclosed techniques can be used to achieve a desired spatial luminance intensity distribution by controlling the luminance intensity of the emitting regions of a lightguide configured as described herein. For example, consider FIG. 16A, which illustrates an example luminance intensity distribution on the surface of a lightguide configured in accordance with an embodiment of the present invention. As can be seen from this example configuration, the disclosed techniques can be used to achieve a gradient in luminance, for instance, with stronger intensity at the center (e.g., the brighter region) and weaker intensity at the perimeter/corners (e.g., the darker region) with a gradual transition in intensity therebetween.

Figure 16B:
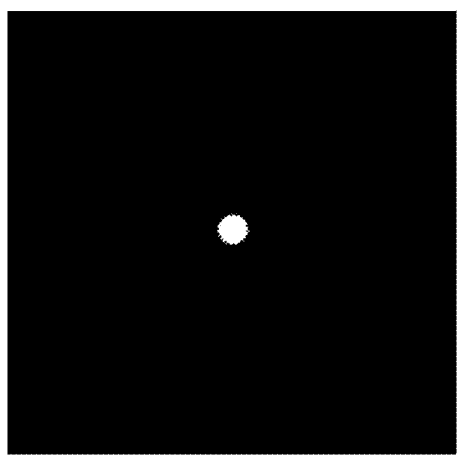
FIG. 16B represents an example high-brightness streetlight.
Figure 16C:
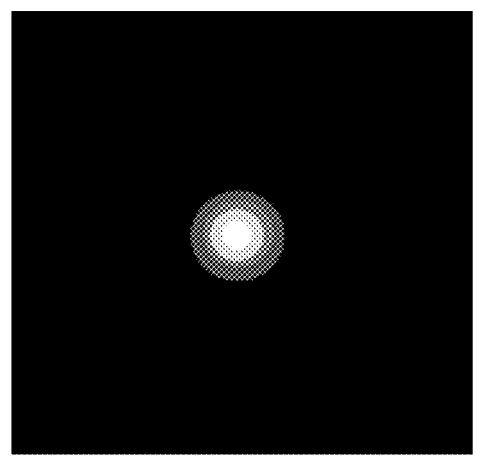
FIG. 16C represents a high-brightness streetlight implementing a lightguide provided using the disclosed techniques, in accordance with an embodiment of the present invention.

Numerous uses of these techniques will be apparent in light of this disclosure. For example, and in accordance with an embodiment, the disclosed techniques can be used to reduce discomfort glare in lighting fixtures by creating a gradual change (e.g., a gradual intensity transition) from brighter to darker regions. For example, consider FIG. 16B, which represents an example high-brightness streetlight which can cause discomfort glare at night due to its high brightness, relatively small size, and dark background. FIG. 16C, however, represents a high-brightness streetlight implementing a lightguide provided using the disclosed techniques, in accordance with an embodiment of the present invention. As can be seen, a large region of the lightguide of FIG. 16C is dedicated to providing a gradual intensity transition from the brighter (higher intensity) center region through a concentric series of increasingly darker (lower intensity) regions. In accordance with an embodiment, such a configuration may eliminate or otherwise substantially reduce discomfort glare from a high-brightness lighting fixture (e.g., streetlight, etc.).

It should be noted, however, that the claimed invention is not limited to achieving only the specific example luminance intensity distributions shown, and that the disclosed techniques, in accordance with an embodiment, can be used to obtain any desired/arbitrary luminance intensity distribution from a lightguide. For instance, a lightguide configured using the disclosed techniques can be made to simulate a wide variety of environmental/lighting conditions (e.g., a blue sky with a shining sun, a dark sky with a moon and stars, etc.). Other suitable uses for controlling the spatial luminance intensity distribution of a lightguide will depend on a given application and will be apparent in light of this disclosure.

Figure 17A:
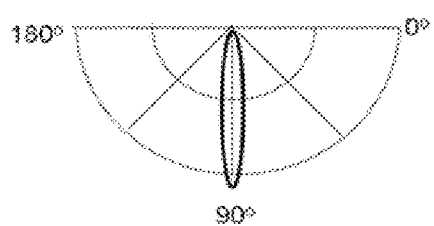
FIGS. 17A-17D are angular distribution plots showing various example angular distributions achievable using the disclosed techniques, in accordance with an embodiment of the present invention.
Figure 17B:
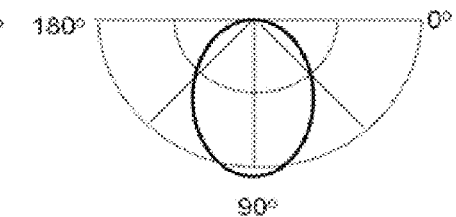
Figure 17C:
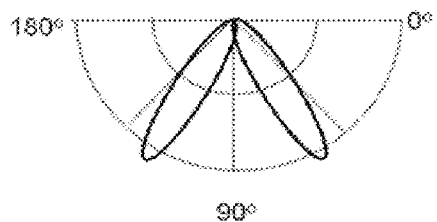
Figure 17D:
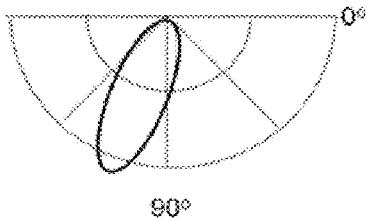

In accordance with an embodiment, the disclosed techniques can be used to achieve a desired angular luminance distribution by controlling the geometry/shape of the internal light extraction features of a lightguide configured as described herein. For example, consider FIGS. 17A-17D, which are angular distribution plots showing various example angular distributions achievable using the disclosed techniques, in accordance with an embodiment of the present invention. As can be seen, a wide variety of light beam distributions can be provided, including, but not limited to: (1) a narrow beam distribution, such as in FIG. 17A (e.g., which can be used for spotlighting applications); (2) a wide beam distribution, such as in FIG. 17B (e.g., which can be used for general illumination applications); (3) a batwing beam distribution, such as in FIG. 17C (e.g., which can be used for illumination of enclosed spaces such as a conference room); and (4) an asymmetric/tilted beam distribution, such as in FIG. 17D (e.g., which can be used for directional lighting such as street lighting). It should be noted, however, that the claimed invention is not limited to achieving only the specific example angular distributions shown, and that the disclosed techniques, in accordance with an embodiment, can be used to obtain any desired/arbitrary angular distribution from a lightguide. Other suitable uses for controlling the angular luminance distribution of a lightguide will depend on a given application and will be apparent in light of this disclosure.

In accordance with an embodiment, the disclosed techniques can be used to control light distribution area and/or angle. For example, in some embodiments, different groups of light sources 130 (e.g., LEDs) can be made to direct light to different internal light extraction features 150 (e.g., materials and/or structures) to achieve different area and/or angular distributions. By turning on different groups of the light sources 130, the light distribution area and/or angle can be made to change as desired. In some other example embodiments, tunable internal light extraction features 150 (e.g., liquid crystals, microelectromechanical systems or MEMS, etc.) can be used to achieve continuously tunable light distribution area and/or angle. Other suitable uses of the disclosed techniques will be apparent in light of this disclosure.

As previously noted, lightguide 110 need not have internal light extraction features 150 within the entirety of its volume, and the distribution of internal light extraction features 150 can be manipulated to provide a lightguide 110 with both emitting and non-emitting regions. In accordance with an embodiment, the emitting and non-emitting regions of a lightguide 110 (e.g., resultant from the density/distribution of internal light extraction features 150 therein) can be configured to produce a wide variety of patterns, pictures, characters, words, etc., within lightguide 110. Various suitable uses of these techniques will be apparent in light of this disclosure.

Numerous embodiments will be apparent in light of this disclosure. One example embodiment of the present invention provides a lightguide including a bulk of optical material and a plurality of internal light extraction features provided completely within an internal region of the bulk of optical material, wherein the plurality of internal light extraction features is configured to direct incident light out of the lightguide. In some cases, the lightguide is planar. In some other cases, the lightguide is curved, rounded, or non-planar. In some example cases, the bulk of optical material includes at least one of a solid, gas, liquid, and/or vacuum. In some cases, the plurality of internal light extraction features is configured to provide at least one of a desired spatial and/or angular distribution of luminance, illuminance, luminous intensity, color, color temperature, correlated color temperature (CCT), and/or color rendering index (CRI). In some instances, the lightguide includes a plurality of zones including at least a first zone and a second zone, the first zone encompassing a first sub-set of the plurality of internal light extraction features and the second zone encompassing a second sub-set of the plurality of internal light extraction features, and wherein the internal light extraction features of the first sub-set are configured differently from the internal light extraction features of the second sub-set. In some such cases, a density of internal light extraction features of the first zone is different from a density of internal light extraction features of the second zone. In some other such cases, the internal light extraction features of the first sub-set comprise a material different from the internal light extraction features of the second sub-set. In some still other such cases, the internal light extraction features of the first sub-set are sized differently from the internal light extraction features of the second sub-set. In yet other such cases, the internal light extraction features of the first sub-set are of a different geometry/shape than the internal light extraction features of the second sub-set. In some other such cases, the lightguide further includes one or more additional zones, each of which encompasses a different sub-set of the plurality of internal light extraction features, wherein each of the sub-sets is configured uniquely with respect to the other sub-sets. In some instances, the lightguide further includes a plurality of surficial light extraction features provided on at least one surface of the bulk of optical material, wherein the plurality of surficial light extraction features is configured to direct incident light out of the lightguide. In some cases, a multi-layered lightguide including two or more of the aforementioned lightguide arranged in a stacked configuration is provided. In some other cases, a multi-sectioned lightguide including two or more of the aforementioned lightguide arranged in a laterally adjacent configuration is provided.

Another example embodiment of the present invention provides a method of making a lightguide, the method including providing a bulk of optical material and providing a plurality of internal light extraction features completely within an internal region of the bulk of optical material, wherein the plurality of internal light extraction features is configured to direct incident light out of the lightguide. In some cases, providing the plurality of internal light extraction features includes using at least one of a three-dimensional printing process, a laser-based process, an injection molding process, a machining process, an extrusion process, an embossment process, and/or a stacking process. In some cases, the method further includes providing a plurality of surficial light extraction features on at least one surface of the bulk of optical material, wherein the plurality of surficial light extraction features is configured to direct incident light out of the lightguide. In some instances, the method further includes dividing the lightguide into a plurality of zones including at least a first zone and a second zone, wherein the first zone encompasses a first sub-set of the plurality of internal light extraction features and the second zone encompasses a second sub-set of the plurality of internal light extraction features, and wherein the internal light extraction features of the first sub-set are configured differently from the internal light extraction features of the second sub-set. In some cases, the method further includes adjusting one or more of the plurality of internal light extraction features to at least one of alter spatial luminance intensity distribution, alter angular luminance distribution, provide the lightguide with one or more non-emitting regions, and/or reduce discomfort glare. In some example cases, a lighting device including one or more of the lightguide provided by the aforementioned techniques is provided.

Another example embodiment of the present invention provides a lighting device including a lightguide including a bulk of optical material and a plurality of internal light extraction features provided completely within an internal region of the bulk of optical material, wherein the plurality of internal light extraction features is configured to direct incident light out of the lightguide, and one or more light sources configured to couple light into the lightguide. In some example cases, the bulk of optical material includes at least one of a solid, gas, liquid, and/or vacuum. In some cases, the lighting device further includes a plurality of surficial light extraction features provided on at least one surface of the bulk of optical material, wherein the plurality of surficial light extraction features is configured to direct incident light out of the lightguide. In some instances, the plurality of internal light extraction features is configured to provide the lighting device with at least one of single-sided emission and/or double-sided emission without use of a reflector. In some cases, the plurality of internal light extraction features is configured to provide at least one of a desired spatial and/or angular distribution of luminance, illuminance, luminous intensity, color, color temperature, correlated color temperature (CCT), and/or color rendering index (CRI). In some cases, the lighting device further includes at least one reflector. In some example cases, the one or more light sources comprise light emitting diodes (LEDs) and/or multi-colored LEDs. In some instances, light from the one or more light sources is coupled into the lightguide by at least one of direct coupling, embedded coupling, total internal reflection (TIR) lens coupling, and/or reflector-based coupling. In some specific example cases, the lighting device is a panel/fixture, a bulb, a tube, a ring, or a three-dimensional structure/sculpture. In some instances, the lighting device is transparent or semi-transparent and is configured to function as a window and a lighting fixture. In some cases, a multi-layered lighting device including two or more of the aforementioned lighting device arranged in a stacked configuration is provided. In some other cases, a multi-sectioned lightguide including two or more of the aforementioned lightguide arranged in a laterally adjacent configuration is provided.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A lightguide comprising:
   a bulk of optical material; and
   a plurality of internal light extraction features provided completely within an internal region of the bulk of optical material, wherein the plurality of internal light extraction features is configured to direct incident light out of the lightguide wherein the lightguide is curved, rounded, or non-planar.

2. The lightguide of claim 1, wherein the bulk of optical material comprises at least one of a solid, gas, liquid, and/or vacuum.

3. The lightguide of claim 1, wherein the plurality of internal light extraction features is configured to provide at least one of a desired spatial and/or angular distribution of luminance, illuminance, luminous intensity, color, color temperature, correlated color temperature (CCT), and/or color rendering index (CRI).

4. The lightguide of claim 1, wherein the lightguide comprises a plurality of zones including at least a first zone and a second zone, the first zone encompassing a first sub-set of the plurality of internal light extraction features and the second zone encompassing a second sub-set of the plurality of internal light extraction features, and wherein the internal light extraction features of the first sub-set are configured differently from the internal light extraction features of the second sub-set.

5. The lightguide of claim 4, wherein a density of internal light extraction features of the first zone is different from a density of internal light extraction features of the second zone.

6. The lightguide of claim 4, wherein the internal light extraction features of the first sub-set comprise a material different from the internal light extraction features of the second sub-set.

7. The lightguide of claim 4, wherein the internal light extraction features of the first sub-set are sized differently from the internal light extraction features of the second sub-set.

8. The lightguide of claim 4, wherein the internal light extraction features of the first sub-set are of a different geometry/shape than the internal light extraction features of the second sub-set.

9. The lightguide of claim 4 further comprising one or more additional zones, each of which encompasses a different sub-set of the plurality of internal light extraction features, wherein each of the sub-sets is configured uniquely with respect to the other sub-sets.

10. The lightguide of claim 1 further comprising a plurality of surficial light extraction features provided on at least one surface of the bulk of optical material, wherein the plurality of surficial light extraction features is configured to direct incident light out of the lightguide.

11. A multi-layered lightguide comprising two or more of the lightguide of claim 1 arranged in a stacked configuration.

12. A multi-sectioned lightguide comprising two or more of the lightguide of claim 1 arranged in a laterally adjacent configuration.

13. A method of making a lightguide, the method comprising:
    providing a bulk of optical material;
    providing a plurality of internal light extraction features completely within an internal region of the bulk of optical material, wherein the plurality of internal light extraction features is configured to direct incident light out of the lightguide;
    dividing the lightguide into a plurality of zones including at least a first zone and a second zone, wherein the first zone encompasses a first sub-set of the plurality of internal light extraction features and the second zone encompasses a second sub-set of the plurality of internal light extraction features, and wherein the internal light extraction features of the first sub-set are configured differently from the internal light extraction features of the second sub-set wherein the internal light extraction features of the first zone comprise a material different from the internal light extraction features of the second zone.

14. The method of claim 13, wherein providing the plurality of internal light extraction features comprises using at least one of a three-dimensional printing process, a laser-based process, an injection molding process, a machining process, an extrusion process, an embossment process, and/or a stacking process.

15. The method of claim 13 further comprising providing a plurality of surficial light extraction features on at least one surface of the bulk of optical material, wherein the plurality of surficial light extraction features is configured to direct incident light out of the lightguide.

16. The method of claim 13 further comprising adjusting one or more of the plurality of internal light extraction features to at least one of alter spatial luminance intensity distribution, alter angular luminance distribution, provide the lightguide with one or more non-emitting regions, and/or reduce discomfort glare.

17. A lighting device comprising one or more of the lightguide provided by claim 13.

18. A multi-sectioned lighting device comprising:
two or more lighting devices arranged in a laterally adjacent configuration with each lightguide comprising:
a bulk of optical material; and
a plurality of internal light extraction features provided completely within an internal region of the bulk of optical material, wherein the plurality of internal light extraction features is configured to direct incident light out of the lightguide; and
one or more light sources configured to couple light into the lightguide.

19. The multi-sectioned lighting device of claim 18, wherein the bulk of optical material comprises at least one of a solid, gas, liquid, and/or vacuum.

20. The multi-sectioned lighting device of claim 18 further comprising a plurality of surficial light extraction features provided on at least one surface of the bulk of optical material, wherein the plurality of surficial light extraction features is configured to direct incident light out of the lightguide.

21. The multi-sectioned lighting device of claim 18, wherein the plurality of internal light extraction features is configured to provide the lighting device with at least one of single-sided emission and/or double-sided emission without use of a reflector.

22. The multi-sectioned lighting device of claim 18, wherein the plurality of internal light extraction features is configured to provide at least one of a desired spatial and/or angular distribution of luminance, illuminance, luminous intensity, color, color temperature, correlated color temperature (CCT), and/or color rendering index (CRI).

23. The multi-sectioned lighting device of claim 18 further comprising at least one reflector.

24. The multi-sectioned lighting device of claim 18, wherein the one or more light sources comprise light emitting diodes (LEDs) and/or multi-colored LEDs.

25. The multi-sectioned lighting device of claim 18, wherein light from the one or more light sources is coupled into the lightguide by at least one of direct coupling, embedded coupling, total internal reflection (TIR) lens coupling, and/or reflector-based coupling.

26. The multi-sectioned lighting device of claim 18, wherein the lighting device comprises a panel/fixture, a bulb, a tube, a ring, or a three-dimensional structure/sculpture.

27. The multi-sectioned lighting device of claim 18, wherein the lighting device is transparent or semi-transparent and is configured to function as a window and a lighting fixture.

28. The multi-sectioned lighting device of claim 18, wherein each lightguide is planar.

29. The multi-sectioned lighting device of claim 18, wherein each lightguide is curved, rounded, or non-planar.

30. A lighting device comprising:
a lightguide comprising:
a bulk of optical material; and
a plurality of internal light extraction features provided completely within an internal region of the bulk of optical material, wherein the plurality of internal light extraction features is configured to direct incident light out of the lightguide; and
one or more light sources configured to couple light into the lightguide wherein the lighting device is transparent or semi-transparent and is configured to function as a window and a lighting fixture.

31. The lighting device of claim 30, wherein the lightguide comprises a plurality of zones including at least a first zone and a second zone, the first zone encompassing a first sub-set of the plurality of internal light extraction features and the second zone encompassing a second sub-set of the plurality of internal light extraction features, and wherein the internal light extraction features of the first sub-set are configured differently from the internal light extraction features of the second sub-set.

32. The lighting device of claim 30, wherein the bulk of optical material comprises at least one of a solid, gas, liquid, and/or vacuum.

33. The lighting device of claim 30 further comprising a plurality of surficial light extraction features provided on at least one surface of the bulk of optical material, wherein the plurality of surficial light extraction features is configured to direct incident light out of the lightguide.

\* \* \* \* \*